(12) United States Patent
Kumar et al.

(10) Patent No.: US 9,540,241 B2
(45) Date of Patent: Jan. 10, 2017

(54) CATALYSTS FOR PRODUCING HYDROGEN AND SYNTHESIS GAS

(71) Applicants: Prashant Kumar, Edmonton (CA); David Lynch, Burlington, CT (US)

(72) Inventors: Prashant Kumar, Edmonton (CA); David Lynch, Burlington, CT (US)

(73) Assignee: Enerkem, Inc., Montreal, Quebec (CA)

( * ) Notice: Subject to any disclaimer, the term of this patent is extended or adjusted under 35 U.S.C. 154(b) by 0 days.

(21) Appl. No.: 14/688,345

(22) Filed: Apr. 16, 2015

(65) Prior Publication Data

US 2015/0307352 A1 Oct. 29, 2015

Related U.S. Application Data

(63) Continuation-in-part of application No. 14/212,295, filed on Mar. 14, 2014, now Pat. No. 9,034,786.
(Continued)

(51) Int. Cl.
*B01J 23/00* (2006.01)
*B01J 23/02* (2006.01)
(Continued)

(52) U.S. Cl.
CPC ............... *C01B 3/40* (2013.01); *B01J 23/02* (2013.01); *B01J 23/10* (2013.01); *B01J 23/75* (2013.01); *B01J 23/755* (2013.01); *B01J 23/78* (2013.01); *B01J 23/83* (2013.01); *B01J 29/0308* (2013.01); *B01J 29/0333* (2013.01); *B01J 35/002* (2013.01); *B01J 35/023* (2013.01); *B01J 35/1019* (2013.01); *B01J 35/1042* (2013.01); *B01J 35/1047* (2013.01); *B01J 35/1061* (2013.01); *B01J 37/0018* (2013.01); *B01J 37/031* (2013.01); *B01J 37/10* (2013.01); *B01J 37/18* (2013.01); *B01J 37/06* (2013.01); *B01J 2523/00* (2013.01); *C01B 2203/0238* (2013.01); *C01B 2203/1052* (2013.01); *C01B 2203/1058* (2013.01); *C01B 2203/1082* (2013.01); *C01B 2203/1241* (2013.01); *Y02P 20/142* (2015.11); *Y10S 502/524* (2013.01)

(58) Field of Classification Search
CPC ............ B01J 23/02; B01J 23/04; B01J 23/10; B01J 23/75; B01J 23/755; B01J 23/78; B01J 23/83; B01J 21/04; B01J 21/066; B01J 21/10; B01J 35/002; B01J 35/023; B01J 35/1019; B01J 35/1061
USPC ....... 502/302–304, 327, 328, 332, 335, 337, 502/349, 355, 439
See application file for complete search history.

(56) References Cited

U.S. PATENT DOCUMENTS 3,432,443 A * 3/1969 Hughes ............... B01J 23/75
423/652
5,395,813 A 3/1995 Clavenna et al.
(Continued)

OTHER PUBLICATIONS

Kumar, et al., Energy & Fuels, vol. 22, pp. 3575-3582 (2008).
(Continued)

*Primary Examiner* — Cam N. Nguyen
(74) *Attorney, Agent, or Firm* — Raymond J. Lillie

(57) ABSTRACT

A catalyst which comprises nickel and/or cobalt supported on a support that includes a mixed oxide containing metals, such as aluminum, zirconium, lanthanum, magnesium, cerium, calcium, and yttrium. Such catalysts are useful for converting carbon dioxide to carbon monoxide, and for converting methane to hydrogen.

21 Claims, 19 Drawing Sheets

Related U.S. Application Data

(60) Provisional application No. 61/802,857, filed on Mar. 18, 2013.

(51) Int. Cl.

| | | |
|---|---|---|
| *B01J 23/08* | (2006.01) | |
| *B01J 23/10* | (2006.01) | |
| *B01J 23/40* | (2006.01) | |
| *B01J 23/42* | (2006.01) | |
| *B01J 23/56* | (2006.01) | |
| *B01J 23/58* | (2006.01) | |
| *B01J 21/04* | (2006.01) | |
| *C01B 3/40* | (2006.01) | |
| *B01J 23/78* | (2006.01) | |
| *B01J 23/83* | (2006.01) | |
| *B01J 35/10* | (2006.01) | |
| *B01J 37/03* | (2006.01) | |
| *B01J 37/10* | (2006.01) | |
| *B01J 37/18* | (2006.01) | |
| *B01J 23/75* | (2006.01) | |
| *B01J 23/755* | (2006.01) | |
| *B01J 29/03* | (2006.01) | |
| *B01J 35/00* | (2006.01) | |
| *B01J 35/02* | (2006.01) | |
| *B01J 37/00* | (2006.01) | |
| *B01J 37/06* | (2006.01) | |

(56) References Cited

U.S. PATENT DOCUMENTS

| | | |
|---|---|---|
| 5,607,892 A | 3/1997 | Chopin et al. |
| 5,679,614 A | 10/1997 | Bangala et al. |
| 6,150,299 A * | 11/2000 | Umemoto ............... B01J 23/10 423/213.2 |
| 6,294,140 B1 | 9/2001 | Mussmann et al. |
| 6,306,794 B1 | 10/2001 | Suzuki et al. |
| 6,326,329 B1 | 12/2001 | Nunan |
| 6,489,264 B1 * | 12/2002 | Isupova ............... B01J 23/002 502/302 |
| 6,528,451 B2 | 3/2003 | Brezny et al. |
| 6,858,193 B2 * | 2/2005 | Ruwisch ........... B01D 53/9422 423/213.5 |
| 7,824,656 B2 | 11/2010 | Idem et al. |
| 7,838,710 B2 * | 11/2010 | Ryu ..................... B01J 21/005 502/327 |
| 8,137,655 B2 | 3/2012 | Chornet et al. |
| 8,143,186 B2 | 3/2012 | Rytter |
| 8,465,714 B2 | 6/2013 | Augustine |
| 8,932,774 B2 * | 1/2015 | Melo Faus ............ B01J 21/10 423/654 |
| 2008/0064914 A1 * | 3/2008 | Fokema ............... B01J 23/002 588/403 |
| 2009/0232728 A1 | 9/2009 | Wagner et al. |
| 2012/0121500 A1 | 5/2012 | Wagner et al. |
| 2012/0122674 A1 * | 5/2012 | Mordkovich ........ B01D 53/945 502/314 |
| 2012/0129690 A1 | 5/2012 | Larcher et al. |
| 2014/0275584 A1 | 9/2014 | Beck et al. |

OTHER PUBLICATIONS

Li, et al., Inorganic Chemistry, vol. 48, No. 10, pp. 4421-4434 (2009).
Khan, et al., Energy & Fuels, vol. 26, pp. 365-379 (Nov. 16, 2011).
Sengupta, et al., Energy & Fuels, vol. 26, pp. 816-828 (Jan. 11, 2012).

* cited by examiner

CATALYSTS FOR PRODUCING HYDROGEN AND SYNTHESIS GAS

This application is a continuation-in-part of application Ser. No. 14/212,295, filed Mar. 14, 2014, which claims priority based on provisional application Ser. No. 61/802,857, filed Mar. 18, 2013, the contents of which are incorporated by reference in their entireties.

This invention relates to catalysts. More particularly, this invention relates to catalysts that include nickel and/or cobalt, and a support including a mixed oxide containing two or more metals. Such catalysts are useful especially in converting synthesis gas byproducts, such as carbon dioxide and methane, into hydrogen, carbon monoxide, and synthesis gas.

The term "mixed oxide", as used herein, means a compound containing oxygen and two or more other elements. At least some of the oxygen atoms may be bound covalently into oxoanions, and/or at least some of the oxygen atoms may be bound to one or more of the other elements, and/or at least some of the oxygen atoms may be bound as fine mixtures of two or more oxides. More particularly, as noted hereinabove, the mixed oxides employed in the present invention include two or more metals. Such metals include, but are not limited to, alkali metals, alkaline earth metals, transition metals, rare earth metals, and metals of the Lanthanide Series of the Periodic Table.

Synthesis gas may be produced by gasifying biomass (such as, for example, municipal solid waste or other refuse-derived products), or coal, in a gasifier, whereby a crude synthesis gas may be produced. In addition to hydrogen and carbon monoxide, the crude synthesis gas may include carbon dioxide as well as methane. Such a crude synthesis gas, in contrast to synthesis gas produced as a result of natural gas reforming, may have a low molar $H_2/CO$ ratio, and a high molar $CO_2/CO$ ratio. The "biogenic" $CO_2$ that is produced may be recycled into the synthesis gas production process in order to increase the CO content for downstream carbonylation as well as to reduce greenhouse gas emissions.

Also, the gasification process generates methane, which sometimes is not reformed without a catalyst under typical biomass gasification conditions (e.g., less than 1,100° C. and less than 3 bar pressure). The methane in general is collected as tail gas. The "biogenic" methane may be a good source of hydrogen for hydrogenation reactions, such as, for example, in producing alcohols such as ethanol from acetates.

It is an object of the present invention to provide a catalyst which may be used in the reforming of carbon dioxide and methane in order to produce carbon monoxide, hydrogen, or synthesis gas. Thus, in accordance with an aspect of the present invention, there is provided a catalyst that comprises at least one catalytic metal. The at least one catalytic metal is selected from the group consisting of nickel, cobalt, or a combination of nickel and cobalt. The catalyst also comprises a support that includes a mixed oxide containing at least three metals. The at least three metals are selected from the group consisting of aluminum, zirconium, lanthanum, magnesium, cerium, calcium, potassium, and yttrium, with the provisos that, when the support contains only three metals, the three metals are not aluminum, lanthanum, and magnesium, and when the support contains only four metals, the four metals are not cerium, lanthanum, potassium, and calcium.

In a non-limiting embodiment, the at least one catalytic metal is nickel. In another non-limiting embodiment, the at least one catalytic metal is cobalt. In yet another non-limiting embodiment, the at least one catalytic metal is a combination of nickel and cobalt.

In another non-limiting embodiment, the support includes a mixed oxide containing aluminum, calcium, and magnesium. In another non-limiting embodiment, the mixed oxide further contains lanthanum.

In another non-limiting embodiment, the support includes a mixed oxide containing cerium, lanthanum, and zirconium.

In another non-limiting embodiment, the support includes a mixed oxide containing aluminum, cerium, zirconium, and calcium.

In another non-limiting embodiment, the support includes a mixed oxide containing cerium, zirconium, and aluminum. In yet another non-limiting embodiment, the mixed oxide further contains magnesium.

In another non-limiting embodiment, when the mixed oxide contains aluminum, the aluminum is present in the catalyst, on a metal basis, in an amount of from about 20 atom % to about 92 atom %. In yet another non-limiting embodiment, aluminum is present in the catalyst, on a metal basis, in an amount of from about 35 atom % to about 75 atom %.

In another non-limiting embodiment, when the mixed oxide contains calcium, the calcium is present in the catalyst, on a metal basis, in an amount of from about 2 atom % to about 50 atom %. In yet another non-limiting embodiment, calcium is present in the catalyst, on a metal basis, in an amount of from about 2 atom % to about 35 atom %.

In another non-limiting embodiment, when the mixed oxide contains magnesium, the magnesium is present in the catalyst, on a metal basis, in an amount of from about 10 atom % to about 65 atom %. In yet another non-limiting embodiment, the magnesium is present in the catalyst, on a metal basis, in an amount of from about 15 atom % to about 50 atom %.

In another non-limiting embodiment, when the metal oxide contains zirconium, the zirconium is present in the catalyst, on a metal basis, in an amount of from about 2 atom % to about 30 atom %. In yet another non-limiting embodiment, the zirconium is present in the catalyst, on a metal basis, in an amount of from 5 atom % to about 30 atom %.

In another non-limiting embodiment, when the metal oxide contains yttrium, the yttrium is present in the catalyst, on a metal basis, in an amount of from about 2 atom % to about 15 atom %. In yet another non-limiting embodiment, the yttrium is present in the catalyst, on a metal basis, in an amount of from about 3 atom % to about 10 atom %.

In another non-limiting embodiment, the catalyst comprises nickel supported on a mixed oxide support comprising aluminum, zirconium, and yttrium. The catalyst, in a non-limiting embodiment, on a metal basis, contains up to about 10 wt. % nickel, up to about 50 wt. % aluminum, up to about 30 wt. % zirconium, and up to about 8 wt. % yttrium. In yet another non-limiting embodiment, the catalyst, on a metal basis, includes 70 atom % aluminum, 8 atom % nickel, 3.5 atom % yttrium, and 18.5 atom % zirconium.

In yet another non-limiting embodiment, the at least one catalytic metal is nickel and the support includes a mixed oxide containing magnesium, lanthanum, calcium, and aluminum. In a further non-limiting embodiment, the catalyst, on a metal basis, includes 5 atom % nickel, 20 atom % magnesium, 20 atom % lanthanum, 5 atom % calcium, and 50 atom % aluminum.

In another non-limiting embodiment, the at least one catalytic metal is nickel, and the support includes a mixed oxide containing cerium, lanthanum, and zirconium. In a further non-limiting embodiment, the catalyst includes, on a metal basis, 5 atom % nickel, 50 atom % cerium, 15 atom % lanthanum, and 30 atom % zirconium.

In another non-limiting embodiment, the at least one catalytic metal is nickel, and the support includes a mixed oxide containing magnesium, cerium, zirconium, and aluminum. In a further non-limiting embodiment, the catalyst includes, on a metal basis, 2 atom % nickel, 60 atom % magnesium, 5 atom % cerium, 3 atom % zirconium, and 30 atom % aluminum.

In accordance with another aspect of the present invention, there is provided a catalyst that includes nickel, cobalt, and a mixed oxide containing magnesium and aluminum. The catalyst includes, on a metal basis, 4 atom % nickel, 3 atom % cobalt, 60 atom % magnesium, and 33 atom % aluminum.

In a non-limiting embodiment, the finished catalyst has a surface area of from about 140 $m^2/g$ to about 250 $m^2/g$. In another non-limiting embodiment, the catalyst has a surface area of from about 120 $m^2/g$ to about 200 $m^2/g$.

In a non-limiting embodiment, the at least one catalytic metal has a particle size of from about 5 nm to about 50 nm. In another non-limiting embodiment, the at least one catalytic metal has a particle size of from about 5 nm to about 10 nm.

In a non-limiting embodiment, the support has a particle size of from about 5 nm to about 100 nm. In another non-limiting embodiment, the support has a particle size of from about 5 nm to about 15 nm.

The catalysts of the present invention, in a non-limiting embodiment, may be made by preparing the supports by a surfactant assisted templating process, followed by treating the materials at high temperature (up to 650° C.) in the presence of air to remove impurities generally present on the support surface during the templating process. The supports then are treated thermally in order to impregnate the nickel and/or cobalt at desired concentrations. It is to be understood, however, that the scope of the present invention is not to be limited to any particular method of making the catalysts.

The catalysts may be used in conjunction with various reactions, and in particular, in conjunction with reforming reactions in which carbon monoxide and/or methane are subjected to reforming to produce carbon monoxide and/or hydrogen. Such reactions include, but are not limited to, dry reforming, steam aided reforming, oxygen aided reforming, steam and oxygen aided reforming, and autothermal reforming. It is to be understood, however, that the scope of the present invention is not to be limited to any particular reaction, reactants, or products.

In accordance with another aspect of the present invention, there is provided a process for converting a feedstock comprising carbon dioxide and methane to synthesis gas. The process comprises heating said feedstock to a temperature of from about 650° C. to about 950° C. and at a pressure of up to 100 psi, in the presence of a catalyst. The catalyst comprises nickel supported on a support including a mixed oxide containing two or more metals. The catalyst has a surface area of from about 140 $m^2/g$ to about 250 $m^2/g$. A product comprising synthesis gas then is recovered.

In a non-limiting embodiment, the feedstock is heated to a temperature of from about 700° C. to about 850° C.

In a non-limiting embodiment, the feedstock is heated at a pressure of from about 15 psi to about 100 psi. In another non-limiting embodiment, the feedstock is heated at a pressure of from about 15 psi to about 60 psi.

In a non-limiting embodiment, the feedstock further comprises steam. In another non-limiting embodiment, steam is present in the feedstock at a molar ratio of steam to total carbon that does not exceed 3:1. In yet another non-limiting embodiment, steam is present in the feedstock at a molar ratio of steam to total carbon of from about 0.7 to about 1.5.

In a non-limiting embodiment, the recovered synthesis gas has a molar ratio of hydrogen to carbon monoxide of from about 0.9 to about 3.4. In another non-limiting embodiment, the recovered synthesis gas has a molar ratio of hydrogen to carbon monoxide of from about 0.9 to about 2.0.

BRIEF DESCRIPTION OF THE DRAWINGS

The invention now will be described with respect to the drawings, wherein.

EXAMPLES

Figure 1:
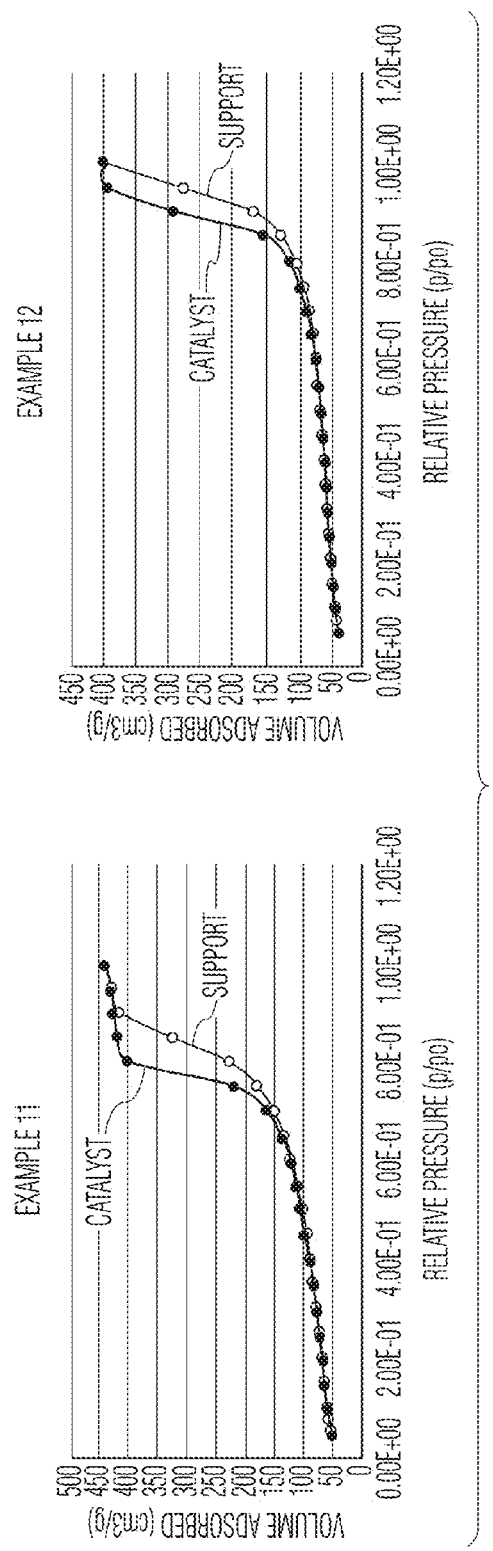
FIG. 1 shows graphs of nitrogen adsorption/desorption isotherms of calcined supports and catalysts of Examples 11 and 12.

The invention now will be described with respect to the following examples. It is to be understood, however, that the scope of the present invention is not intended to be limited thereby.

Example 1

A mixed oxide based on an $Al_{0.5}Ca_{0.5}O_2$ binary was prepared by surfactant assisted templating under basic conditions. Aluminum nitrate hexahydrate and calcium nitrate tetrahydrate precursors were employed to prepare the above catalyst. The aluminum nitrate salt (10.6 g) and calcium nitrate salt (12.0 g) were dissolved separately in deionized water (500 ml each) and mixed together to obtain a 1 liter solution. In a separate beaker, 45 g of cetyl trimethyl ammonium bromide (CTAB) surfactant was dissolved in 1 liter of deionized water at 60° C. The above two solutions were mixed together to obtain a 2 liter solution. Aqueous ammonia (25 vol. %) was added gradually to the solution under vigorous stirring until precipitation was complete (pH 11.6). The precipitate was a gelatinous white-brown colloidal slurry. The slurry was stirred for 60 minutes in a glass reactor, and then transferred into Pyrex glass bottles, and sealed and aged hydrothermally in an air circulated oven for 5 days at 90° C. The mixture then was cooled and the resulting precipitate was filtered and washed repeatedly with warm deionized water. The resulting cakes were oven dried at 120° C. for 12 hours and then calcined at 650° C. for 3 hours in an air environment.

Example 2

A catalyst support was prepared as in Example 1, except that a magnesium nitrate hexahydrate solution (3.9 g in 250 ml deionized water) was added to an aluminum nitrate nonahydrate solution (10.6 g in 500 ml deionized water) and a calcium nitrate tetrahydrate (8.3 g in 250 ml deionized water) solution. The amount of CTAB surfactant was increased in order to maintain a surfactant to Al, Ca, and Mg ratio of 1.25. The nominal composition of the mixed oxide was $Al_{0.5}Ca_{0.35}Mg_{0.15}O_2$.

Example 3

A catalyst support was prepared as described in Example 2, except that a zirconium nitrate hydrate solution (3.5 g in 250 ml deionized water) was added to 7.4 g of aluminum nitrate in 250 ml deionized water, 3.8 g of magnesium nitrate in 250 ml deionized water, and 8.3 g of calcium nitrate in 250 ml deionized water. The amount of CTAB surfactant used was increased in order to maintain a surfactant to metal (Al, Ca, Zr and Mg) ratio of 1.25. The nominal composition of the mixed oxide was $Al_{0.35}Ca_{0.35}Mg_{0.15}Zr_{0.15}O_2$.

Example 4

A catalyst support was prepared as described in Example 3, except that a cerium nitrate hexahydrate (6.5 ml in 250 ml deionized water) solution was added to aluminum nitrate (7.4 g in 500 ml deionized water), magnesium nitrate (3.8 g in 250 ml deionized water), zirconium nitrate (3.5 g in 250 ml deionized water), and calcium nitrate (4.7 g in 250 ml deionized water) solutions. The amount of CTAB surfactant used was increased in order to maintain the ratio of surfactant to metal (Al, Ce, Mg, Zr, and Ca) of 1.25. The nominal composition of the mixed oxide obtained was $Al_{0.35}Ca_{0.20}Ce_{0.15}Mg_{0.15}Zr_{0.15}O_2$.

Example 5

A catalyst support was prepared as described in Example 4, except that a lanthanum nitrate hexahydrate (6.49 g in 250 ml deionized water) solution was added to aluminum nitrate nonahydrate (4.3 g in 500 ml deionized water), magnesium nitrate (3.8 g in 250 ml deionized water), zirconium nitrate (3.5 g in 250 ml deionized water), cerium nitrate (6.52 in 250 ml in deionized water), and calcium nitrate (4.7 g in 250 ml deionized water) solutions. The amount of CTAB surfactant was increased in order to maintain the surfactant to metal (Al, Ce, La, Mg, Zr, and Ca) at 1.25. The nominal composition of the mixed oxide obtained was $Al_{0.20}Ca_{0.20}Ce_{0.15}Mg_{0.15}La_{0.15}Zr_{0.15}O_2$.

Example 6

A catalyst support was prepared as described in Example 5, except that a yttrium nitrate solution (5.7 g in 500 ml deionized water) was added to the aluminum nitrate nonahydrate (4.3 g in 500 ml deionized water), magnesium nitrate hexahydrate (3.8 g in 250 ml deionized water), zirconium nitrate hydrate (3.5 g in 250 ml deionized water), cerium nitrate hexahydrate (6.52 g in 250 ml deionized water), and calcium nitrate tetrahydrate (1.2 ml in 100 ml deionized water) solutions. The amount of CTAB surfactant was increased in order to maintain the ratio of surfactant to metal (Al, Ce, Y, Mg, Zr, and Ca) at 1.25. The nominal composition of the mixed oxide obtained was $Al_{0.20}Ca_{0.5}Ce_{0.15}Mg_{0.15}Zr_{0.15}Y_{0.15}O_2$.

Example 7

A catalyst support was prepared as described in Example 4, except that a lanthanum nitrate solution (4.3 g in 500 ml deionized water) was added to aluminum nitrate (13.8 g in 250 ml deionized water), magnesium nitrate (2.6 g in 250 ml deionized water), and calcium nitrate (3.5 g in 250 ml deionized water) solutions. The amount of CTAB surfactant used was increased in order to maintain the surfactant to metal (Al, La, Mg and Ca) ratio at 1.25. The nominal composition of the mixed oxide obtained was $Al_{0.65}Ca_{0.15}Mg_{0.1}La_{0.1}O_2$.

Each of the catalyst supports of Examples 1 through 7 was divided into three portions (2 g each) and each portion of each support was treated with nickel oxide, cobalt oxide, or a mixture of nickel oxide and cobalt oxide by using a wetness impregnation technique. When only nickel was added, the amount of nickel metal was based on 5 wt % of Ni impregnated on 1.9 g of support. The required amount of nickel nitrate hexahydrate used was 0.5 g dissolved in 10 mL of deionized water. The wet sample (support and nickel nitrate solution) was stirred further overnight at room temperature to obtain a homogeneous precipitate which was dried further overnight at 110° C. to remove the remaining moisture. In a few examples both Ni (wt 5%) and Co (wt 3%) were impregnated simultaneously by dissolving 0.5 g nickel nitrate hexahydrate and 0.3 g cobalt nitrate hexahydrate in 5 mL each of deionized water. These two solutions were mixed prior to wetness impregnate by using 1.84 g of support. The catalysts then were cleaned further at 650° C. for 3 hours in the presence of air to remove all other impurities. The catalysts then were sieved to provide catalysts having a particle size of about 300 μm (0.3 mm), which then were subjected to testing.

Example 8

A mixed oxide based on an $Al_{0.6}Mg_{0.4}O_2$ binary oxide was prepared by surfactant assisted templating under basic conditions. Aluminum nitrate nonahydrate and magnesium nitrate hexahydrate precursors were employed to prepare the above support. The aluminum nitrate salt (8.5 g) and magnesium nitrate salt (15.4 g) were dissolved separately in deionized water (500 mL each) and mixed together to obtain 1 L solution. In a separate beaker, 45 g of cetyltrimethylammonium bromide (CTAB) surfactant was dissolved in 1 L of deionized water at 60° C. The above two solutions were mixed together to obtain a 2 L solution. An aqueous ammonia solution (25 vol %) was added gradually to the solution under vigorous stirring until precipitation was complete (pH 11.6). The precipitate obtained was a gelatinous white-brown colloidal slurry. The slurry was stirred for 60 minutes in a glass reactor, and then transferred into Pyrex glass bottles, and sealed and aged hydrothermally in an air circulated oven for 5 days at 90° C. The mixture was then cooled and the resulting precipitate was filtered and washed repeatedly with warm deionized water. The resulting cakes were oven dried at 120° C. for 12 hours and then calcined at 650° C. for 3 hours in an air environment. The support material obtained then was wetness impregnated with metal salt solutions of nickel and cobalt nitrates simultaneously as hereinabove described. The prepared catalyst obtained had a nominal loading of 3 wt % Co and 4 wt % Ni.

Example 9

A mixed oxide based on an $Al_{0.5}Mg_{0.25}La_{0.25}O_2$ ternary oxide was prepared by surfactant assisted templating under basic conditions. Aluminum nitrate nonahydrate, lanthanum nitrate hexahydrate and magnesium nitrate hexahydrate precursors were employed to prepare the above support. The aluminum nitrate salt (10.6 g), lanthanum nitrate salt (10.8 g) and magnesium nitrate salt (6.4 g) were dissolved separately in deionized water (400 mL each) and mixed together to obtain a 1.2 L solution. In a separate beaker, 45 g of cetyltrimethylammonium bromide (CTAB) surfactant was dissolved in 1 L of deionized water at 60° C. The above two solutions were mixed together to obtain a 2.2 L solution. An aqueous ammonia (25 vol. %) then was added gradually to the solution under vigorous stirring until precipitation was complete (pH 11.6). The precipitate obtained was a gelatinous white-brown colloidal slurry. The slurry was stirred for 60 minutes in a glass reactor, and then transferred into Pyrex glass bottles, and sealed and aged hydrothermally in an air circulated oven for 5 days at 90° C. The mixture then was cooled and the resulting precipitate was filtered and washed repeatedly with warm deionized water. The resulting cakes were oven dried at 120° C. for 12 hours and then calcined at 650° C. for 3 hours in an air environment. The support material obtained then was wetness impregnated with metal salt solutions of nickel and cobalt nitrates simultaneously as hereinabove described. The prepared catalyst obtained had a nominal loading of 4 wt % Co and 4 wt % Ni.

Example 10

A mixed oxide based on a $Ce_{0.5}Zr_{0.3}La_{0.2}O_2$ ternary oxide was prepared by surfactant assisted templating under basic conditions. Cerium nitrate hexahydrate, lanthanum nitrate hexahydrate, and zirconium nitrate hydrate precursors were employed to prepare the above support. The cerium nitrate salt (21.0 g), lanthanum nitrate salt (8.6 g) and zirconium nitrate salt (6.9 g) were dissolved separately in deionized water (400 mL each) and mixed together to obtain a 1.2 L solution. In a separate beaker, 45 g of cetyltrimethylammonium bromide (CTAB) surfactant was dissolved in 1 L of deionized water at 60° C. The above two solutions were mixed together to obtain a 2.2 L solution. An aqueous ammonium solution (25 vol. %) then was added gradually to the solution under vigorous stirring until precipitation was complete (pH 11.6). The precipitate obtained was a gelatinous white-brown colloidal slurry. The slurry was stirred for 60 minutes in a glass reactor, and then transferred into Pyrex glass bottles and sealed and aged hydrothermally in an air-circulated oven for 5 days at 90° C. The mixture then was cooled and the resulting precipitate was filtered and washed repeatedly with warm deionized water. The resulting cakes were oven dried at 120° C. for 12 hours and then calcined at 650° C. for 3 hours in an air environment. The support material obtained then was wetness impregnated with metal salt solutions of nickel and cobalt nitrates simultaneously as hereinabove described. The prepared catalyst obtained had a nominal loading of 3 wt % Co and 5 wt % Ni.

Example 11

A mixed oxide based on $Mg_{0.6}Al_{0.3}Ce_{0.05}Zr_{0.05}O_2$ quaternary oxide was prepared by surfactant assisted templating under basic conditions. Aluminum nitrate nonahydrate, cerium nitrate hexahydrate, magnesium nitrate hexahydrate, and zirconium nitrate hydrate precursors were employed to prepare the above support. The cerium nitrate salt (2.2 g) zirconium nitrate salt (1.2 g), aluminum nitrate salt (6.4 g) and magnesium nitrate salt (15.4 g) were dissolved separately in deionized water (400 mL each) and mixed together to obtain a 1.6 L solution. In a separate beaker, 45 g of cetyltrimethylammonium bromide (CTAB) surfactant was dissolved in 1 L of deionized water at 60° C. The above two solutions were mixed together to obtain a 2.2 L solution. An aqueous ammonia solution (25 vol. %) then was added gradually to the solution under vigorous stirring until precipitation was complete (pH 11.6). The precipitate obtained was a gelatinous white-brown colloidal slurry. The slurry was stirred for 60 minutes in a glass reactor, and then transferred into Pyrex glass bottles, and sealed and aged hydrothermally in an air circulated oven for 5 days at 90° C. The mixture then was cooled and the resulting precipitate was filtered and washed repeatedly with warm deionized water. The resulting cakes were oven dried at 120° C. for 12 hours and then calcined at 650° C. for 3 hours in an air environment. The support material obtained then was wetness impregnated with nickel nitrate hexahydrate solution as hereinabove described. The prepared catalyst obtained had a nominal loading of 2 wt % Ni.

Example 12

A mixed oxide based on $Al_{0.92}Ce_{0.04}Zr_{0.02}Ca_{0.02}O_2$ quaternary oxide was prepared by surfactant assisted templating under basic conditions. Aluminum nitrate nonahydrate, cerium nitrate hexahydrate, calcium nitrate tetrahydrate, and zirconium nitrate hydrate precursors were employed to prepare the above support. The cerium nitrate salt (1.7 g), zirconium nitrate salt (0.46 g), aluminum nitrate salt (34.5 g) and calcium nitrate salt (0.5 g) were dissolved separately in deionized water (400 mL each) and mixed together to obtain a 1.6 L solution. In a separate beaker, 42 g of cetyltrimethylammonium bromide (CTAB) surfactant was dissolved in 1 L of deionized water at 60° C. The above two solutions were mixed together to obtain a 2.2 L solution. An aqueous ammonia solution (25 vol. %) then was added gradually to the solution under vigorous stirring until precipitation was complete (pH 11.6). The precipitate obtained was a gelatinous white-brown colloidal slurry. The slurry was stirred for 60 minutes in a glass reactor, and then transferred into Pyrex glass bottles, and sealed and aged hydrothermally in an air circulated oven for 5 days at 90° C. The mixture then was cooled and the resulting precipitate was filtered and washed repeatedly with warm deionized water. The resulting cakes were oven dried at 120° C. for 12 hours and then calcined at 650° C. for 3 hours in an air environment. The support material obtained then was wetness impregnated with both cobalt and nickel nitrate hexahydrate solution as hereinabove described. The prepared catalyst obtained had a nominal loading of 2 wt % Ni and 1% Co.

Example 13

Catalyst Characterization

A few select catalysts were characterized in order to understand the impact of different dopants used and how the manufacturing technique adopted in support preparation has a positive influence on stability of the catalysts when subjected to activity testing. Two samples (Example 11 and Example 12) were used for comparison, in which the supports and catalysts generated in these examples were characterized for X-ray diffraction (XRD), temperature programmed reduction (TPR), BET surface area and scanning electron microscopy. The present example describes the formation of mesoporous materials and using such materials for active metal (such as nickel or cobalt) to act as a catalyst for reforming applications. Nickel based catalysts supported on mesoporous materials normally present high dispersion due to the large specific surface areas and large pore volumes, as well as uniform pore sizes of the carriers (Table 1). Consequently, the highly dispersed Ni particles over the mesoporous framework are able to provide more accessible Ni active centers for the reactants, accounting for the good activity for these materials. Because one of the major reasons causing the deactivation of the reforming catalyst was the thermal sintering of the Ni particles, the sintering of Ni particles seems to be inevitable under severe reduction and reaction conditions. The use of mesoporous materials as supports, however, could help in controlling the thermal sintering at high temperatures effectively.

TABLE 1

Textural characterization

| Sample | BET surface area (m2/g) | Pore volume Cm3/g | Pore size Nm | Isotherm Type |
| --- | --- | --- | --- | --- |
| Example 8 (support only) | 244 | 0.68 | 9.6 | IV Type H2 |
| E8 (support plus Co and Ni) | 229 | 0.62 | 9.5 | IV Type H2 |
| Example 9 (support only) | 183 | 1.49 | 31.9 | IV Type H2 |
| E9 (support plus Co and Ni) | 172 | 1.11 | 17.5 | IV Type H2 |
| Example 10 (support only) | 225 | 0.38 | 6.3 | IV Type H2 |
| E10 (support plus Co and Ni) | 211 | 0.36 | 6.2 | IV Type H2 |
| Example 11 (support only) | 169 | 0.59 | 9.6 | IV Type H2 |
| E11 (support plus Ni) | 145 | 0.39 | 9.5 | IV Type H2 |
| Example 12 (support only) | 284 | 0.63 | 3.4 | IV Type H2 |
| E12 (support plus Ni and Co) | 240 | 0.62 | 3.4 | IV Type H2 |

It can be seen (Table 1) that upon impregnation of active metal (nickel) or a combination of metals (nickel and cobalt) over the surface of supports, the surface areas and cumulative pore volumes decreased. This is a general phenomenon observed in the case of supported catalysts when an active component is impregnated over its surface. The observed decrease is due mainly to penetration of the dispersed nickel oxide into the pores of the support. The average pore diameter measurements also revealed similar trends; most of the mixed oxide samples also exhibited wider pores. A wider pore size will reduce mass-transfer resistance/limitation to the reforming feed in the catalyst pore networks. The nitrogen adsorption-desorption isotherms as well as pore size distributions of both support and as-synthesized Ni—Co/support calcined at 650° C. as presented in FIG. 1 indicate type IV isotherms with hysteresis loops, which suggest the presence of uniform cylindrical mesopores.

Figure 2:
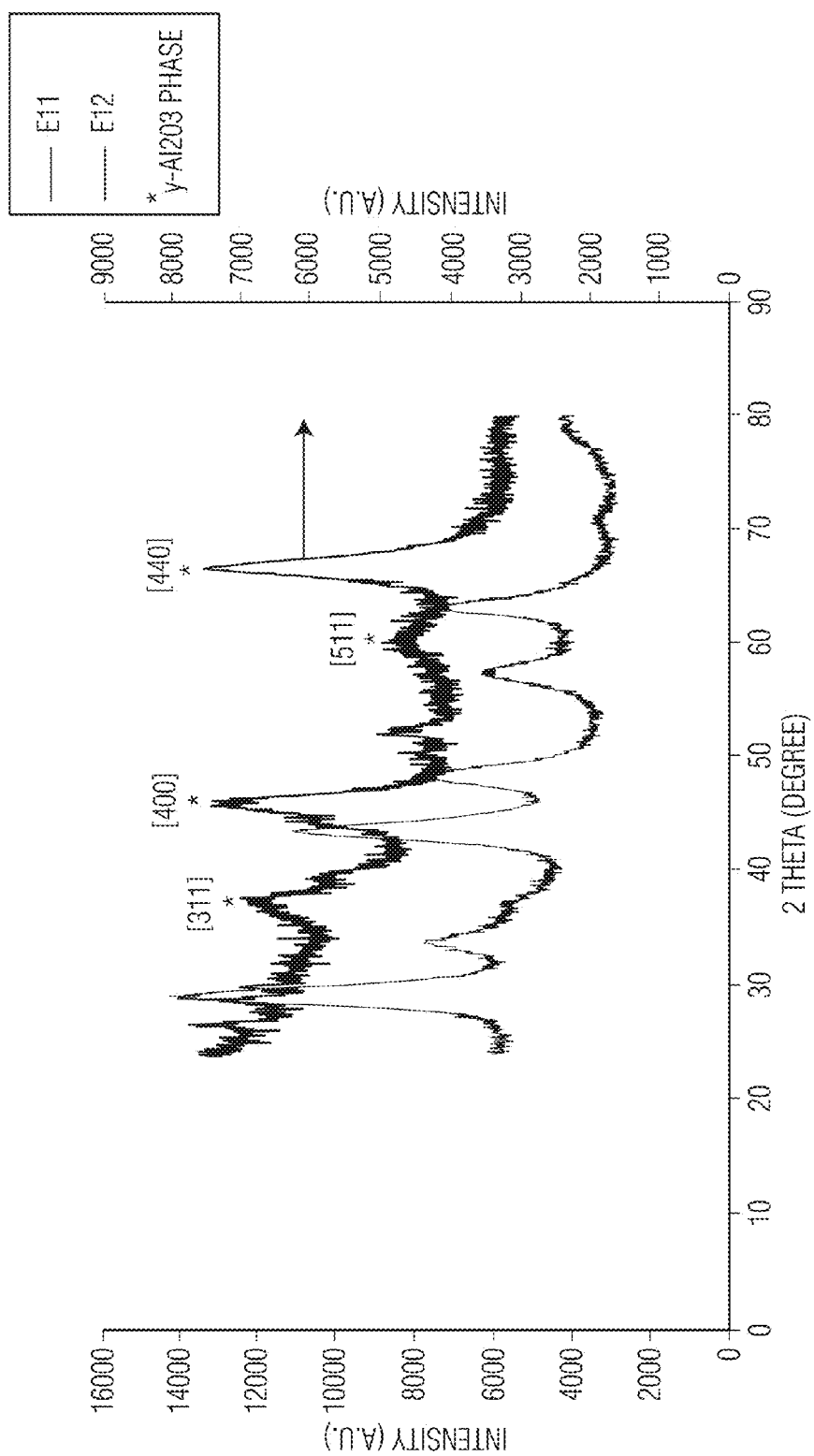
FIG. 2 shows the X-ray diffraction patterns of the catalysts of Examples 11 and 12.

X-ray diffraction patterns (FIG. 2) also reveal that the multi-component metal oxides form solid solutions. In general, the lattice constant tends to decrease as the particle size decreases from bulk (i.e., more than 200 nm) to the nano sizes (i.e., less than 50 nm). Due to the contraction for nano samples, the diffraction lines in general shift to the higher 2-theta values. The catalyst samples prepared in Example 11 and Example 12 were compared, where the higher alumina content sample (Example 12) shows the diffraction lines accredited with $\gamma$-$Al_2O_3$ shifting towards higher 2-theta values. Conversely, the presence of magnesia (Example 11), which has a relatively large ionic radius ($Mg^{2+}$=0.72 A vs $Al^{3+}$=0.53 A) leads to a larger lattice constant and consequently the shift towards lower 2-theta values. In other words, the shift in peak positioning can be attributed to the structural distortion caused by the substitution. The XRD patterns of the calcined samples as presented exhibit four distinct diffraction peaks of $\gamma$-$Al_2O_3$ (JCPDS Card No. 10-0426) which are due to the [311], [400], [511], and [440] planes of the $\gamma$-$Al_2O_3$ species. Furthermore, there were no evident characteristic diffraction peaks of the MO appearing at the loading studied that confirms the high dispersion of NiO among the mesoporous framework.

Figure 3:
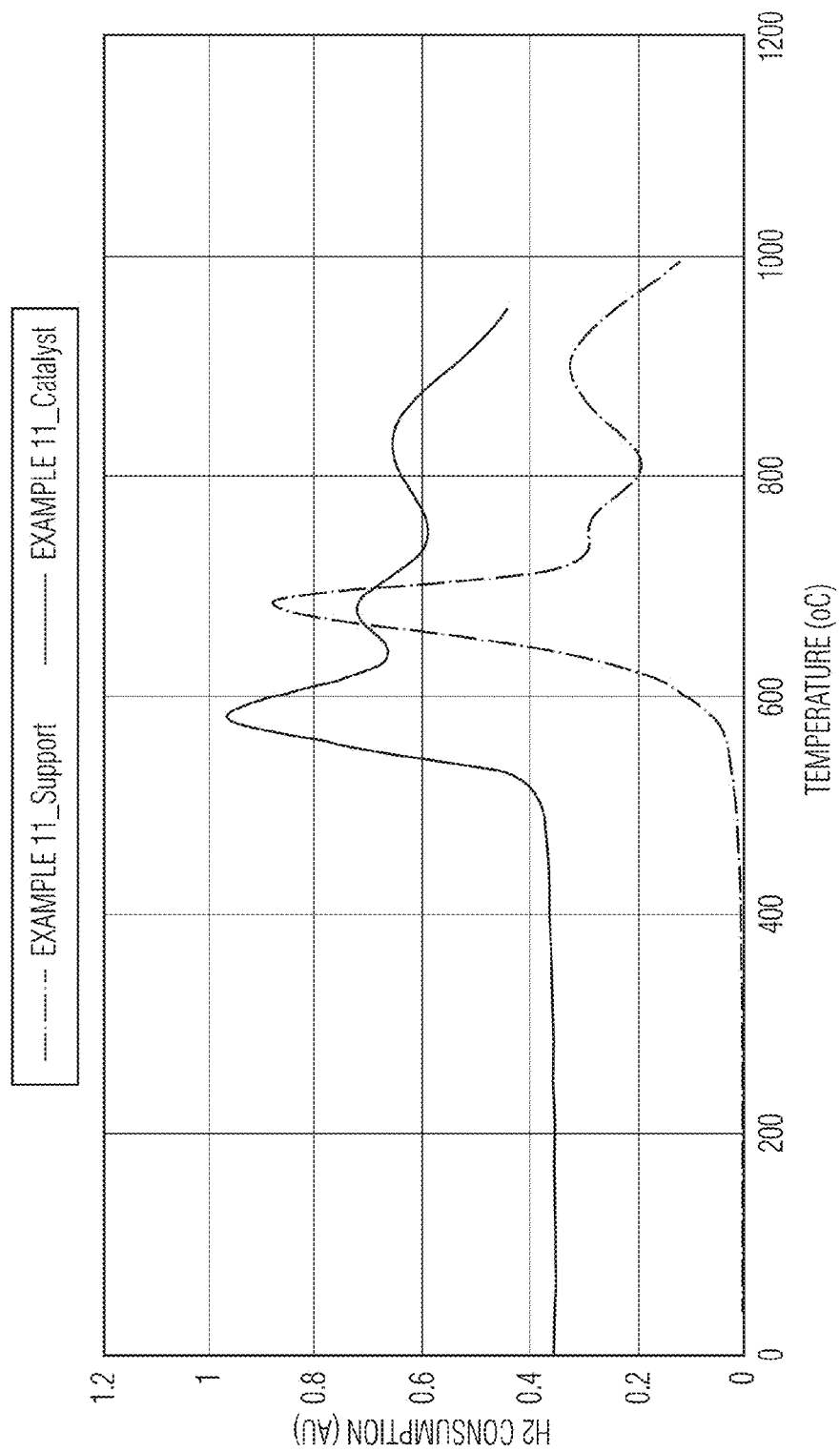
FIG. 3 is a graph showing temperature programmed reduction (TPR) profiles of the support and catalyst of Example 11.

Another parameter that impacts the catalyst stability is the reducibility of the catalyst as it indicates the degree of interactions between metal and support for the metal oxide supported catalyst. The reducibility at lower temperatures is preferred because it indicates a facile formation of the spinel-like species especially in the case of lower Ni loading and a relatively higher alumina percentage. The peak in general associated with a relatively weak interaction of nickel with the mesoporous framework is centered below 600° C. (FIG. 3). A high reducibility at relatively lower temperatures is the key for a good catalytic performance and, in particular, for syngas production as it allows the active site to remain in a reduced state. On the other hand, reducibility at higher temperatures would indicate nickel either in the form of a bulk crystallite (too high loading), or nickel that is embedded deeply into the support structure such as in spinel formation (too low loading). Therefore, TPR technique determines the Ni loading as required on different types of supports. Also there is no bulk nickel reduction peak, indicating the dispersion is nearly complete.

Figure 4:
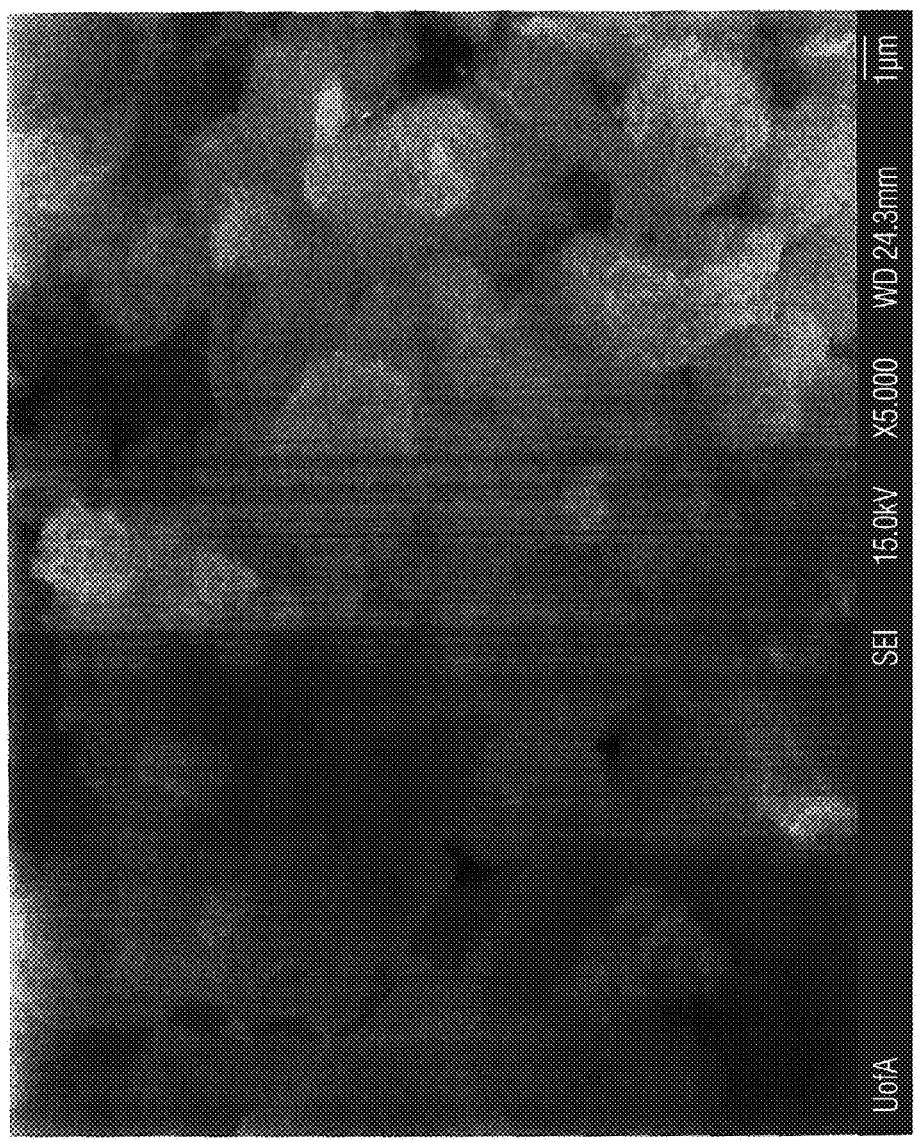
FIG. 4 is a scanning electron micrograph (SEM) image of the catalyst of Example 11.
Figure 5:
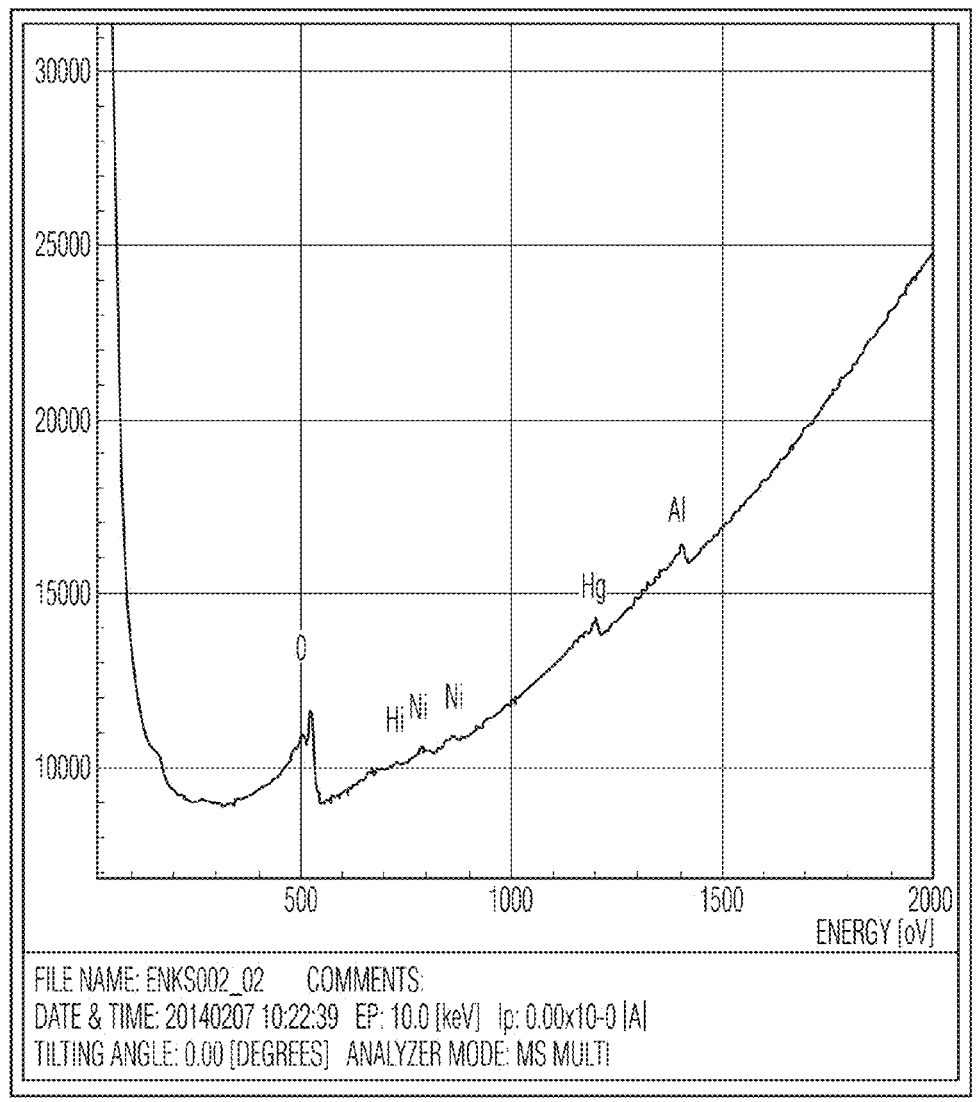
FIG. 5 is an energy dispersive X-ray spectroscopy (EDS) profile of the catalyst of Example 11.
Figure 6:
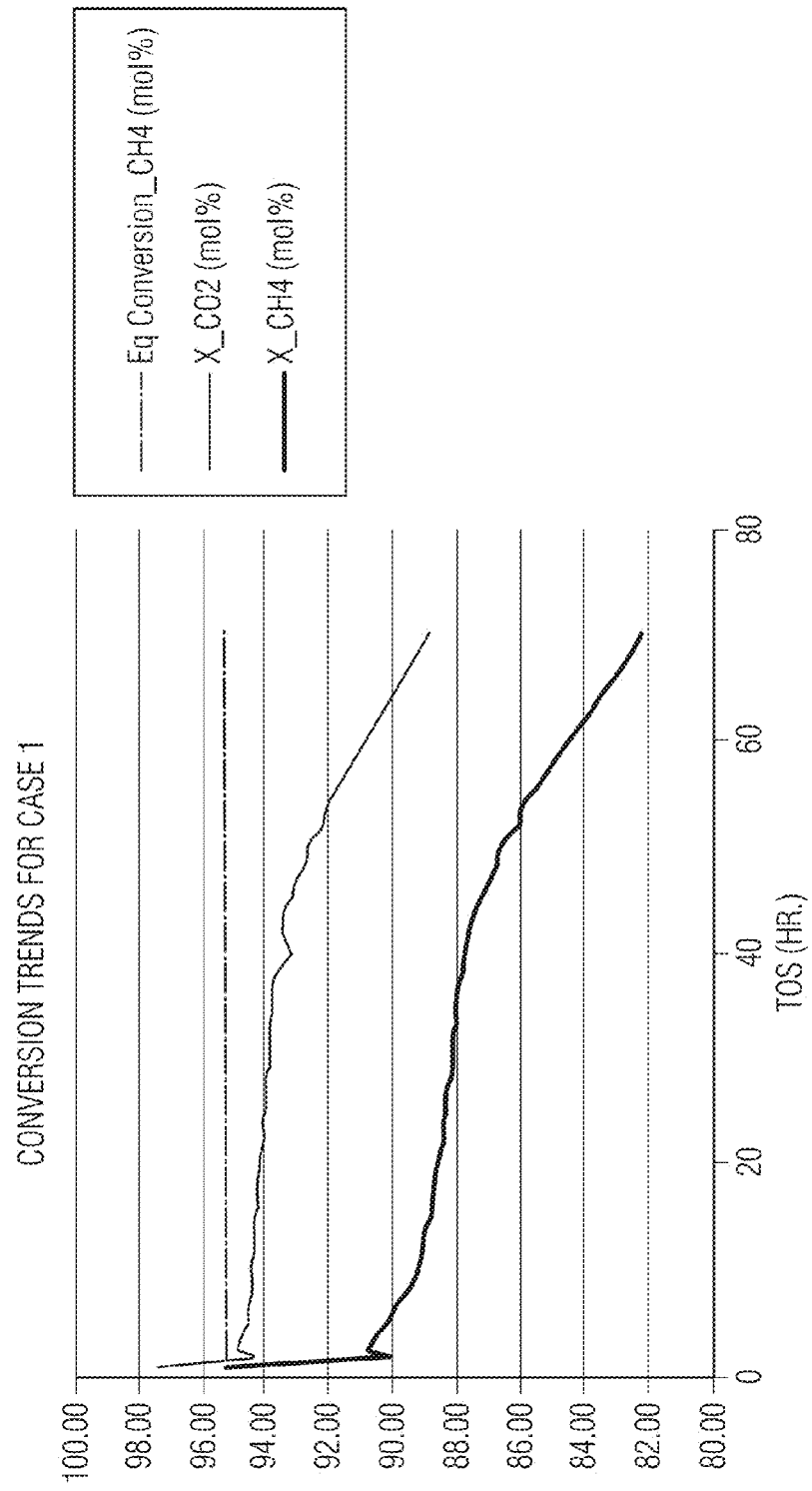
FIGS. 6 through 11 are graphs showing conversion trends for each of the six reactions (Cases 1 through 6, respectively) described in Example 14.
Figure 7:
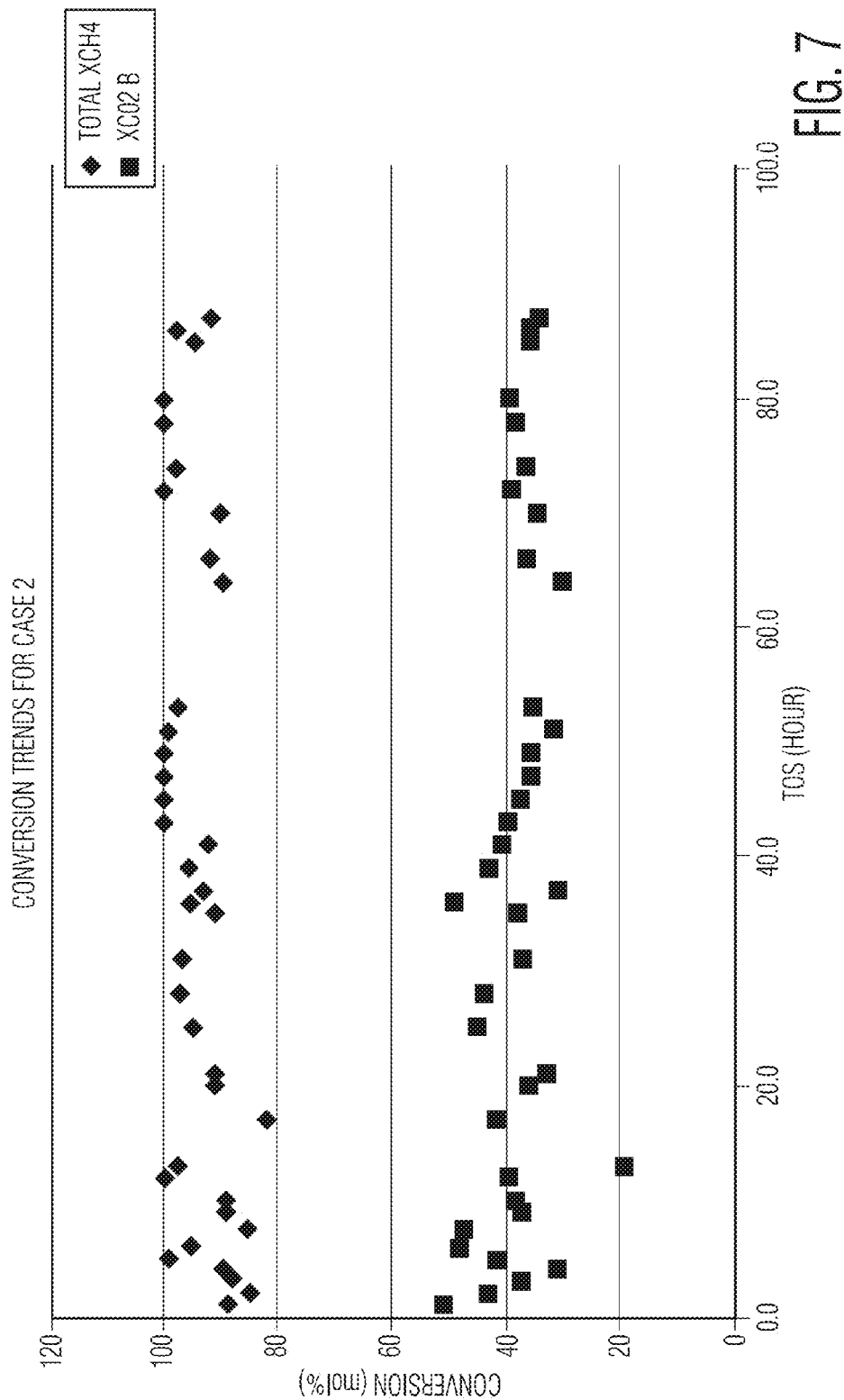
Figure 8:
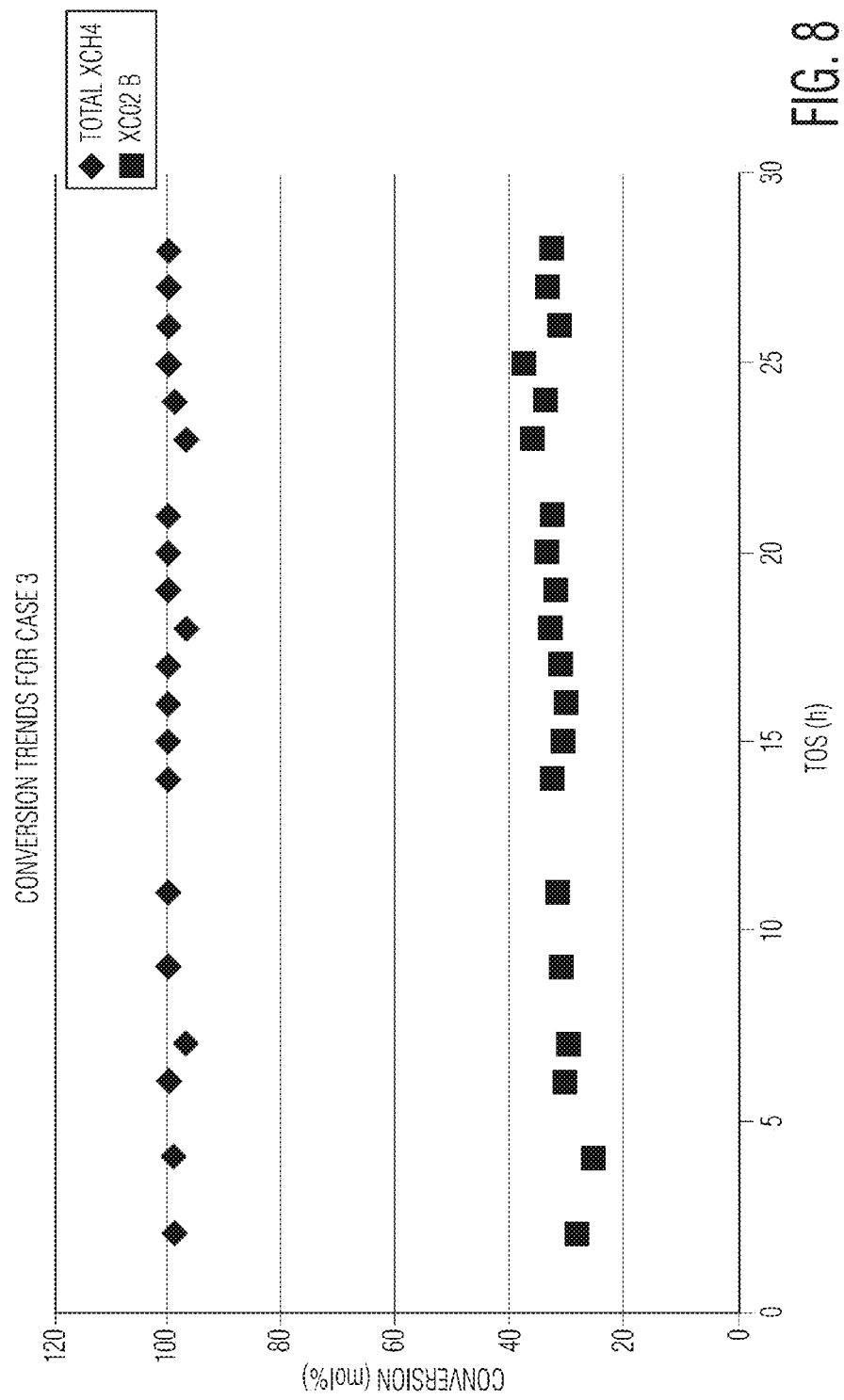
Figure 9:
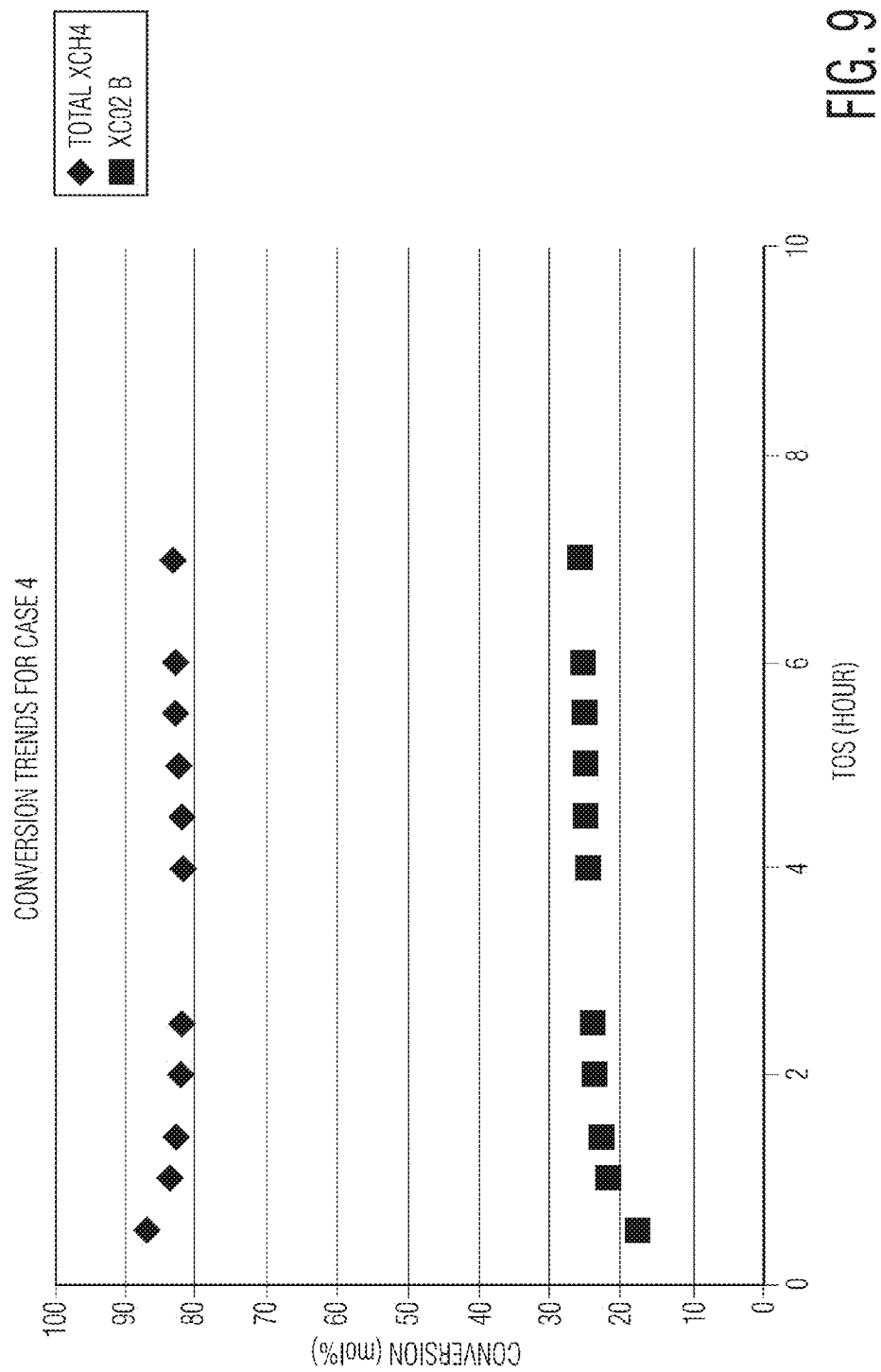
Figure 10:
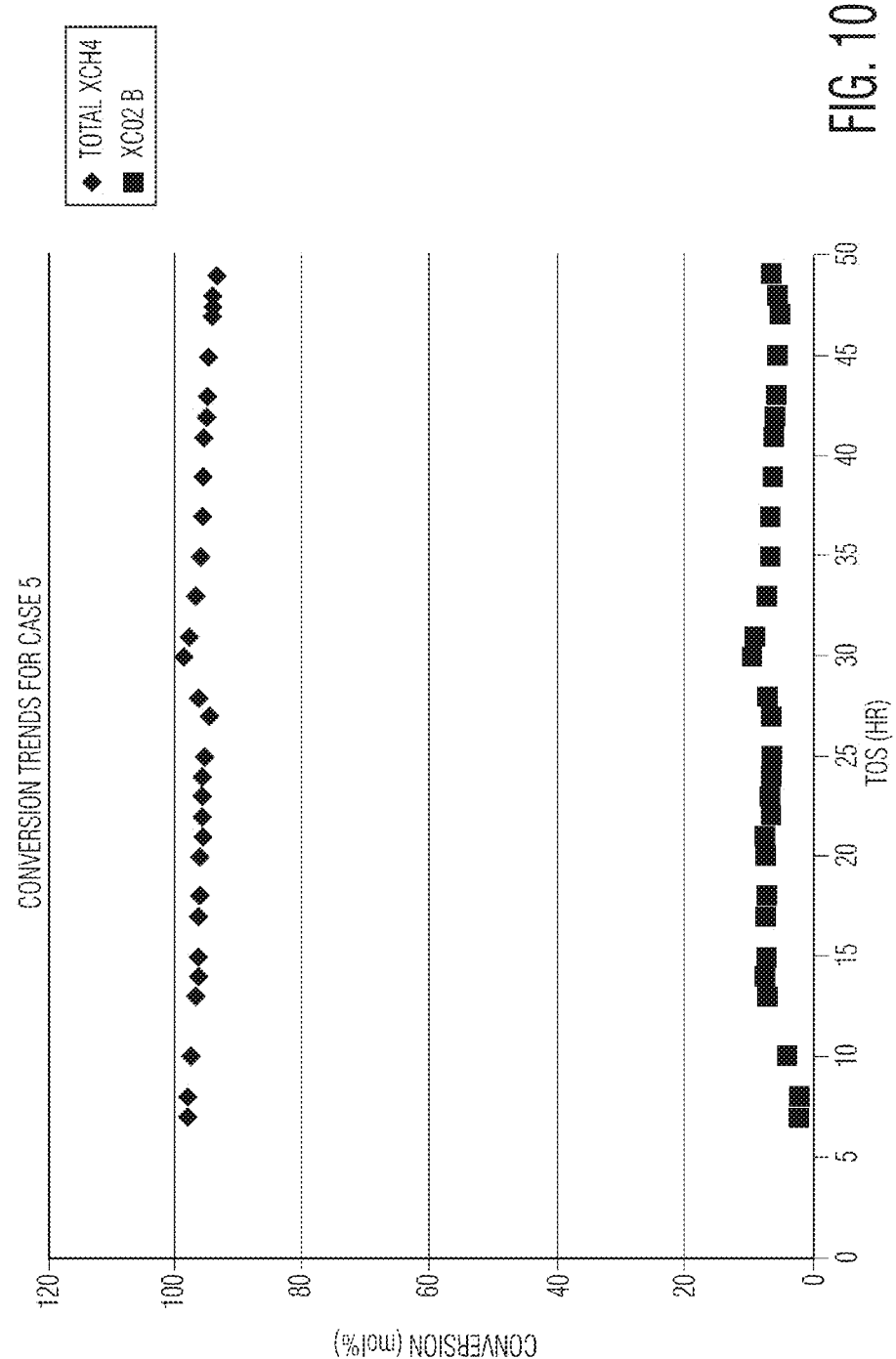
Figure 11:
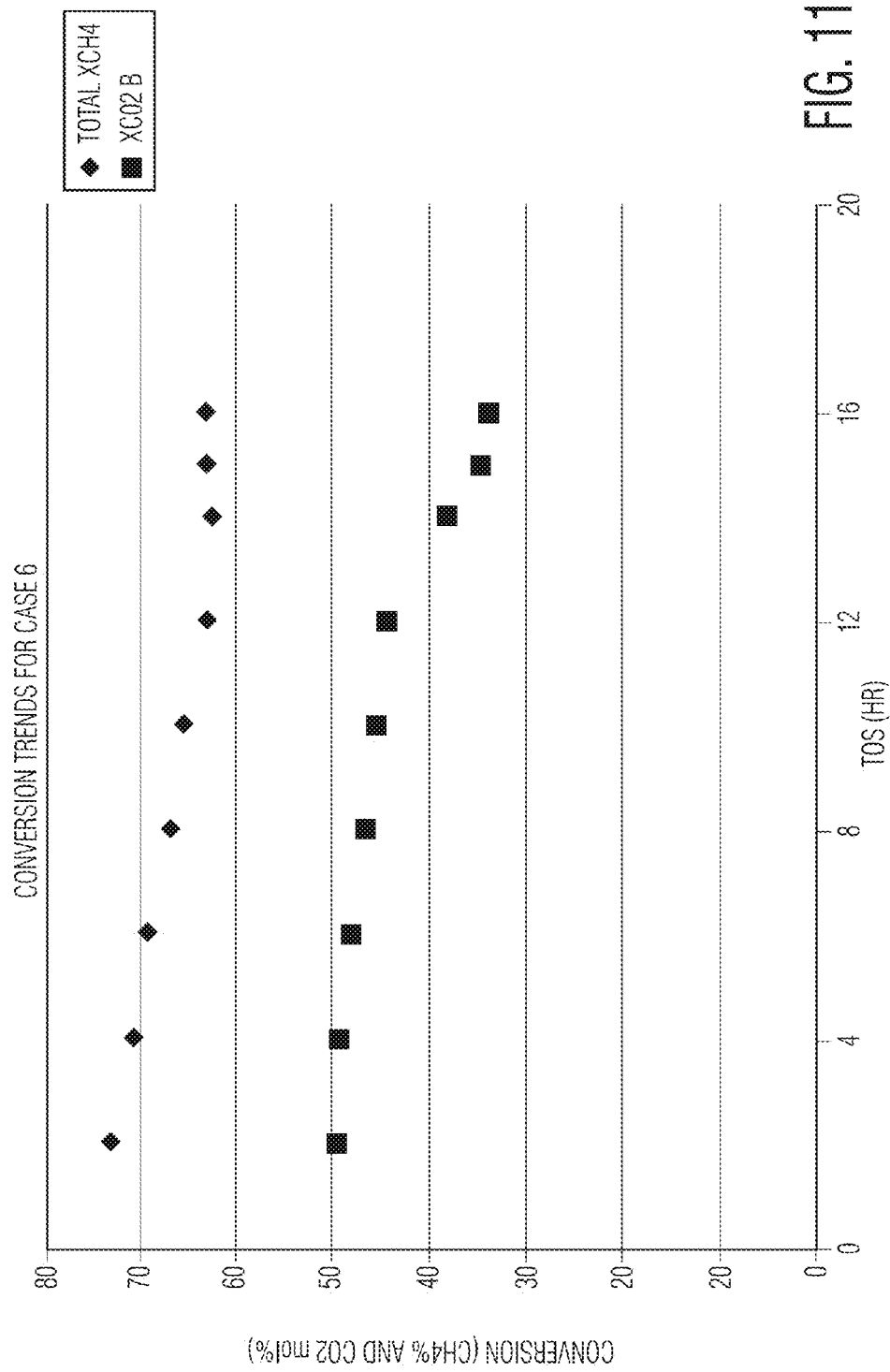

Furthermore, the catalyst as prepared in Example 11 was used for generating a scanning electron micrograph (FIG. 4). In scanning electron microscopy (SEM), an electron beam is scanned across a sample's surface. When the electrons strike the sample, a variety of signals are generated, and it is the detection of specific signals which produces an image or a sample's elemental composition. The three signals which provide the greatest amount of information in SEM either are secondary electrons or X-rays. Secondary electrons are emitted from the atoms occupying the top surface and produce a readily interpretable image of the surface. The contrast in the image is determined by the same morphology. A high resolution image can be obtained because of the small diameter of the primary electron beam. The interaction of the primary beam with atoms in the sample causes shell transitions which result in the emission of an X-ray. The emitted X-ray has an energy characteristic of the parent element. Detection and measurement of the energy permits elemental analysis. Energy Dispersive X-ray Spectroscopy, or EDS, can provide rapid qualitative, or with adequate standards, quantitative analysis of elemental composition with a sampling depth of 1-2 microns. X-rays also may be used to form maps or line profiles, showing the elemental distribution in a sample surface (FIG. 5).

Example 14

Catalyst Testing

An Inconel packed bed tubular reactor (i.e. =½") housed in a furnace with a single heating zone was used for catalyst performance evaluation. The gas flows were metered and regulated by an Omega digital flow controller (DFC 6500). The catalyst bed temperature was measured by means of a sliding thermocouple dipped inside the catalyst bed. The diluent used in the catalyst bed was quartz sand (Caledon Laboratories) having a particle size of 0.3 mm, similar to the catalyst. Pure α-$Al_2O_3$ (Sasol) beads of 0.5 mm also were used in the preheating zone. In order to approach plug flow conditions and minimize back mixing and channeling, certain operating criteria such as the ratio of catalyst bed length to catalyst particle size ($L/D_p$) was maintained at more than 400 and the ratio of the inside diameter of the reactor to particle size ($D/D_p$) was 42. Prior to each experimental run for catalyst evaluation, the catalyst was activated by in situ reduction at 700° C. with 5% $H_2$ in $N_2$ (Airgas, Edmonton, Canada). The catalyst test was accomplished at 850° C. by using a gas-mixture ($CO_2/CH_4$ mole ratio 1) as a feed. The feed and product gases were analyzed with an on-line gas chromatograph (7820, Agilent Technologies) equipped with a TCD (thermal conductivity detector) using a Haysep Q column and a Molsieve 13× column (Alltech Associates) for complete separation of the gaseous components. The experiments were conducted at pressures from atmospheric pressure up to 60 psig under a plug flow regime. The carbon present on the catalyst is analyzed for CHN (carbon, hydrogen, and nitrogen) in order to obtain the C-balance. The amount of water formed is due to the reverse-water-shift reaction (RWGS) and is collected and a materials balance was achieved. The amount of water formed is dependent on the catalyst and the reaction temperature. The total gas volume after the reaction was calculated based on $N_2$ that was used as an internal standard in the feed mixture. The conversions of $CH_4$ and $CO_2$, and selectivity of $H_2$, are defined as follows:

$$\text{Conversion }(CH_4) \% = \frac{(CH_4)in - (CH_4)out}{(CH_4)in} \times 100$$

$$\text{Conversion }(CO_2) \% = \frac{(CO_2)in - (CO_2)out}{(CO_2)in} \times 100$$

$$\text{Selectivity of } H_2 (\%) = \frac{(H_2)out}{(CH_4)in - (CH_4)out} \times \frac{100}{2}$$

One of the important considerations for a reforming operation using a nickel and/or cobalt based catalyst is the stability of the catalyst for an extended period of time. At high temperatures the Boudouard reaction is limited thermodynamically, suggesting that it is desirable to operate at high temperatures; however, methane decomposition is favored at high temperatures; meaning that there is a need to optimize the temperature and the steam-to-carbon (S/C) ratio, which is defined as moles of steam present in the feed divided by the total carbon present at the given feed rate, represented as moles per minute, to minimize the thermodynamic driving force for carbon deposition from associated side reactions. These performances are recorded under different conditions in order to evaluate the stability trend (a plot of conversion of both $CH_4$ and $CO_2$ vs time-on-stream (TOS) of the chosen catalyst and the catalyst was tested for up to 217 hours under different conditions. For the simplicity of this experiment, the same catalyst was tested, starting with case 1 (TOS=from zero to 25 hours, a dry reforming condition) and ending with case 6 (TOS=201 to 217 hours, an autothermal reforming (ATR) condition w/o oxygen). Up to case 5 there was no plugging of the reactor, indicating that the catalyst remained active up to 201 hours. The objective was to see the catalyst deactivation trend under different S/C ratios and how the stoichiometry changed when both steam and $CO_2$ are present. The temperature was kept constant at 850° C. while the flow rate of gas and steam was varied to change the GHSV ($h^{-1}$). Three parameters, conversion of methane (X $CH_4$ mol %), conversion of $CO_2$ (X $CO_2$ mol %) and the product $H_2$/CO ratio were taken into consideration to evaluate the impact of S/C ratio. Only in one condition with a very low S/C ratio (S/C=0.46) has the catalyst performed poorly, and a slow plugging of the reactor was observed, and the reaction was stopped. It also was noticed that presence of steam affected largely the $CO_2$ conversion while methane conversion is affected little. There was a significant change in the $H_2$/CO ratio, and that depends on GHSV to a greater extent.

The catalyst was prepared by wetness impregnation of the support of Example 5 with a 5 wt. % nickel solution. 0.5 g of nickel nitrate hexahydrate solution was dissolved in 10 ml deionized water. The solution then was mixed with 1.9 g of the support of Example 5. The wet sample, i.e., the support and the nickel nitrate solution, was stirred overnight at room temperature to obtain a homogeneous precipitate which was dried overnight at 110° C. The dried catalyst was cleaned further by heating the catalyst in the presence of air for 3 hrs. at 650° C. to remove all other impurities. The catalyst then was sieved to provide catalyst particles having a size of about 0.3 mm. The catalyst then was tested in six cases as summarized and presented in Table 2 below.

TABLE 2

| Case | GHSV (h$^{-1}$) | S/C | Pressure (psig) | Total Flow (ml/min) | Average X_CH$_4$ (mol %) | Average X_CO$_2$ (mol %) | H$_2$/CO Ratio | TOS (hours) | Stability Trend |
|---|---|---|---|---|---|---|---|---|---|
| 1 | 1350 | 0 | Atmos | 100 | 87 | 93 | 1.19 | 70 | Stable |
| 2 | 2100 | 1.5 | Atmos | 162 | 95 | 38 | 2.3 | 90 | Stable |
| 3 | 2500 | 3.0 | 25 | 112 | 99 | 32 | 2.6 | 30 | Very Stable |
| 4 | 3700 | 0.9 | 60 | 68 | 83 | 24 | 2.4 | 7 | Very Stable |
| 5 | 4800 | 1.8 | 60 | 87 | 96 | 7 | 3.4 | 49 | Very Stable |
| 6 | 6500 | 0.46 | 60 | 118 | 67 | 43 | 1.8 | 16 | Slow Plugging |

The comparative data on conversion trends for each of the cases are shown in FIGS. 6 through 11.

Figure 12:
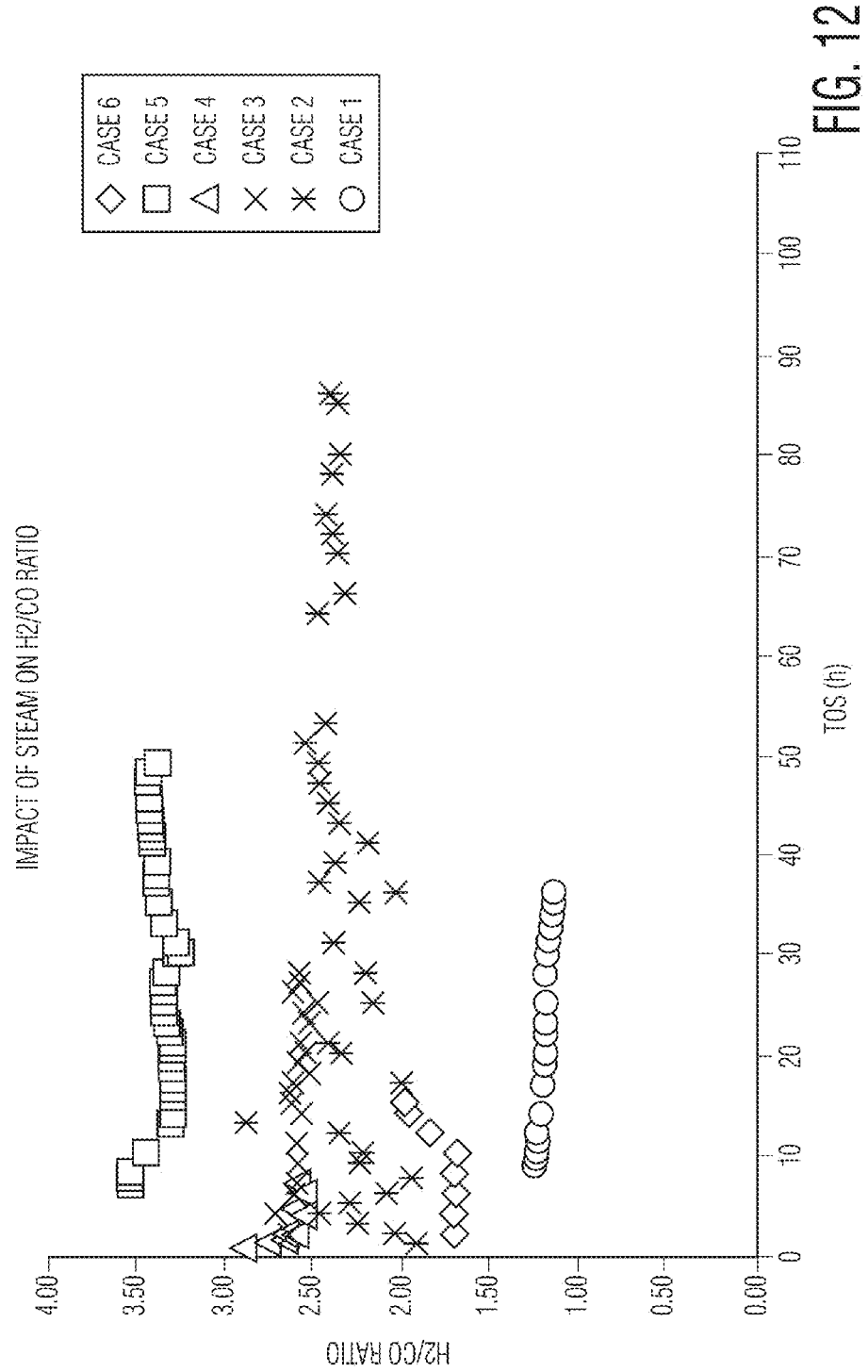
FIG. 12 is a graph showing the impact of steam on the $H_2/CO$ ratio in each of Cases 1 through 6.

The impact of steam on the H$_2$/CO ratio for each of Cases 1 through 6 is shown in FIG. 12.

Example 15

A mixed oxide based on $Al_{0.75}Y_{0.035}Zr_{0.0215}O_2$ was prepared by a surfactant assisted templating route under alkaline conditions. Aluminum nitrate nonahydrate, zirconyl nitrate, and yttrium nitrate hexahydrate precursors were employed to prepare the above mixed oxide. 5.4 g of yttrium nitrate salt and 19.9 g of zirconyl nitrate salt were dissolved separately in deionized water (1 liter each) and mixed together (solution A). 112.5 g of aluminum nonahydrate was dissolved in 2 liters of water and mixed with solution A to get solution B. In a separate beaker, 125 g of surfactant—cetyl trimethylammonium bromide (CTAB) was dissolved in 3 liters of deionized water at 60° C. (solution C). The clear solution B and clear solution C were mixed together to obtain a final mixture solution. Aqueous ammonia (25 vol %) was added gradually to the aforementioned mixture solutions under vigorous stirring until precipitation was complete (pH 11.6). The addition of ammonia induced the precipitation of a gelatinous colloidal slurry. The slurry was stirred for 60 min. in a glass reactor and transferred subsequently into Pyrex glass bottles, sealed and aged hydrothermally in an air circulated oven for 5 days at 92° C. After this time, the mixture was cooled and the resulting precipitate was filtered and washed repeatedly with warm deionized water. The resulting cakes were oven dried at 120° C. for 12 hours and then calcined at 650° C. for 4 hours in air environment to recover the support material (25 g).

The catalyst support was treated further with nickel oxide, by using a wetness impregnation technique. The amount of nickel metal was 5 wt. % of Ni impregnated on 19 g of support. The required amount of nickel nitrate hexahydrate used was 5 g dissolved in 500 ml of deionized water. The wet sample (support and nickel nitrate solution) was stirred using a rotary evaporator overnight at room temperature to obtain a homogeneous precipitate which was dried further by removing water from the system. The semi-dried material was dried further overnight at 110° C. to remove the remaining moisture. The catalyst was cleaned further at 650° C. for 3 hours in the presence of air to remove all other impurities to recover about 20 g with 95% recovery. The surface area of this catalyst was determined to be 203.7 m$^2$/g. The catalyst samples then were sieved to provide catalysts having a support which has a particle size of about 300 μm (0.3 mm), which then were subjected to testing.

Example 16

A mixed oxide based on $Al_{0.7}Ni_{0.08}Y_{0.035}Zr_{0.185}O_2$ was prepared by a surfactant assisted templating route under alkaline conditions. Aluminum nitrate nonahydrate, nickel nitrate hexahydrate, zirconyl nitrate and yttrium nitrate hexahydrate precursors were employed to prepare the above mixed oxide. In a typical preparation, 4.6 g of yttrium nitrate salt and 14.6 g of zirconyl nitrate salt, were dissolved separately in deionized water (1 liter each) and mixed together (solution A). 90 g of aluminum nonahydrate was dissolved in 2 liters of water to get solution B. 7.8 g of nickel nitrate hexahydrate was dissolved in 1 liter of water to get solution C. Solution B and solution C were mixed together further to get a clear greenish solution D. In a separate beaker, 125 g of surfactant—cetyl trimethylammonium bromide (CTAB) was dissolved in 3 liters of deionized water at 60° C. (solution E). The clear solution A, clear solution D and clear solution E were mixed together further to obtain a final mixture solution. Aqueous ammonia (25 vol %) was added gradually to the aforementioned mixture solutions under vigorous stirring until precipitation was complete (pH 11.6). The addition of ammonia induced the precipitation of a gelatinous greenish colloidal slurry. The slurry was stirred for 60 min. in a glass reactor and transferred subsequently into Pyrex glass bottles, sealed and aged hydrothermally in an air circulated oven for 5 days at 92° C. After this time, the mixture was cooled and the resulting precipitate was filtered and washed repeatedly with warm deionized water. The resulting cakes were oven-dried at 120° C. for 12 hours and calcined at 650° C. for 4 hours in an air environment to recover the support material (25 g) with a surface area of 341 m$^2$/g.

The catalyst support was treated thermally at 850° C. for 4 hours to induce spinel formation between the nickel and alumina. The high temperature treated support was used further for wetness impregnation of nickel oxide. The amount of nickel metal was 5 wt. % of Ni impregnated on 19 g of support. The required amount of nickel nitrate hexahydrate used was 5 g dissolved in 500 ml of deionized water. The wet sample (support and nickel nitrate solution) was stirred using a rotary evaporator overnight at room temperature to obtain a homogeneous precipitate which was dried further by removing water from the system. The semi-dried material was dried further overnight at 110° C. to remove the remaining moisture. The catalyst was cleaned further at 650° C. for 3 hours in the presence of air to remove all other impurities to recover about 20 g with 95% recovery. The surface area of the final catalyst material was measured as 197 m$^2$/g. The catalyst samples then were sieved to provide catalysts having a support which has a particle size of about 300 μm (0.3 mm), which then were subjected to testing.

The influence of support materials for Ni based catalysts has proven that certain high surface area supports can be effective in increasing Ni dispersion and thermal stability, thereby decreasing the deactivation over time of the catalysts due to sintering and migration effects. Within the dry reforming reaction, the nickel catalyst supported on nanosized supports had shown high thermal stability and had strong anti-carbon properties due to high preparative control, resulting in well dispersed active metal sites which interacted to a strong degree with the support structure. The incorporation of active metals directly into the framework of mesoporous type support is designed to combine the benefit of a high surface area support, and the availability of highly distributed active metal sites with nano-size particles. It is expected that the Ni nanoparticles interact with the support sufficiently to minimize sintering at the required high temperatures, forming larger particles on the outer surface of the material, resulting in the formation of carbon deposits which hindered the reaction. The method used here leads to the production of a highly ordered, thermally stable support structure containing active Ni particles within the micropore channels that have a reduced likelihood of sintering at critical high temperatures during the dry reforming. In order to establish further the quality of the catalyst produced, a variety of tests were employed to characterize the catalysts. Such tests included BET surface area, X-ray diffraction (XRD), X-ray photoelectron spectroscopy (XPS), carbon, hydrogen, and nitrogen analysis (CHN), temperature programmed reduction (TPR), thermogravimetric analysis (TGA) for used catalyst, scanning electron micrograph (SEM), tunneling electron micrograph for both fresh and used catalyst, and also surface and bulk analysis for determination of metals in the catalyst using a neutron activation analysis (NAA) technique.

Figure 13:
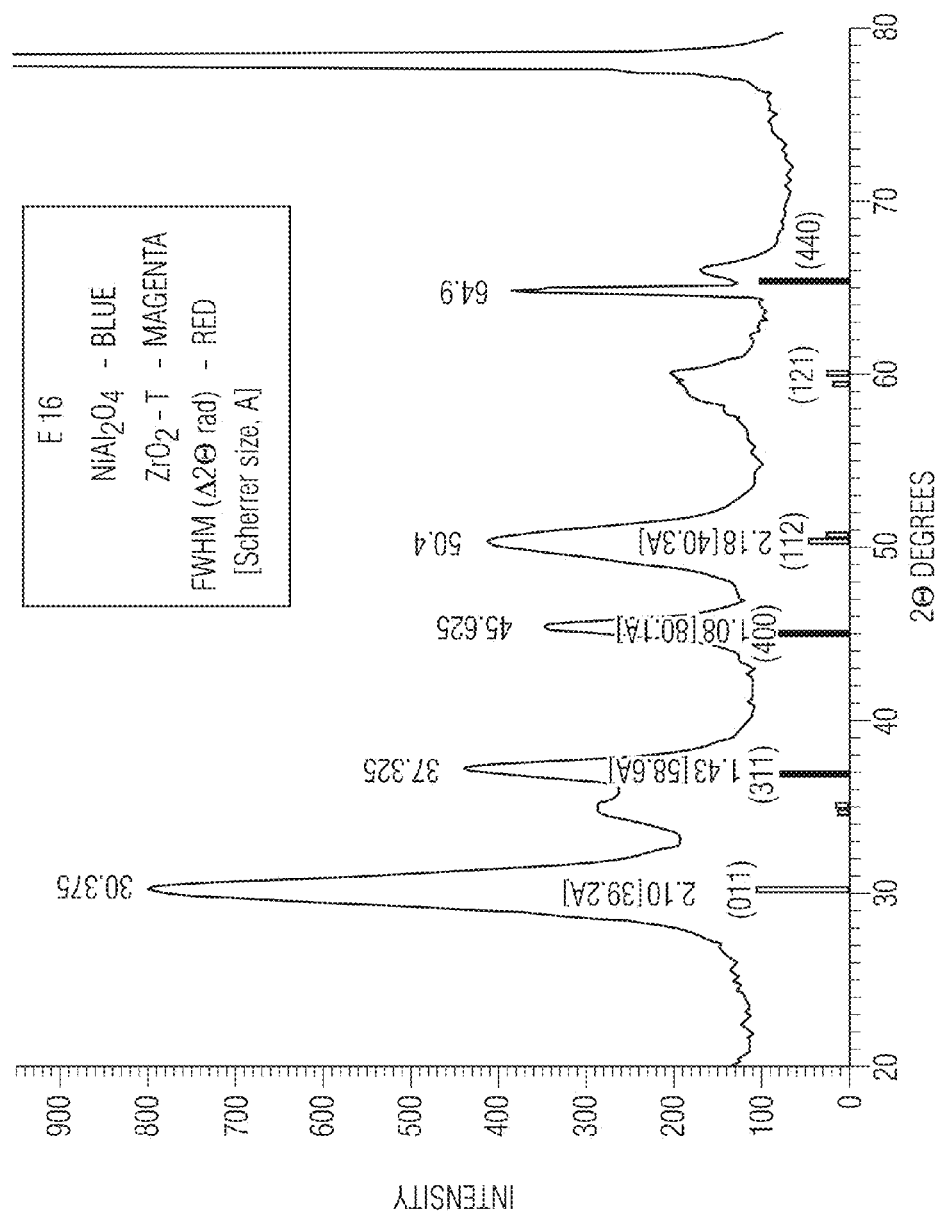
FIG. 13 shows an x-ray diffraction (XRD) powder diffraction pattern of a catalyst sample of Example 16. Crystal phases are identified as spinel $NiAl_2O_4$ and $ZrO_2$. Vertical lines: reference data for $NiAl_2O_4$ (blue) and $ZrO_2$ (T) (magenta) from the 2014 International Centre for Diffraction Data-Powder Diffraction File (PDF). Particle size ($\tau$) is estimated using the Scherrer relation $\tau=K\lambda/(\beta \cos \theta)$, where $K=0.0.9$, $\lambda=1.54056$ Å, $\beta=FWHM$ ($\Delta 2\theta$, radians), and $\theta$ is the Bragg angle in degrees.

The wide angle X-ray diffraction pattern of the prepared calcined catalyst is presented in FIG. 13. No diffraction peaks due to $Al_2O_3$ were present in the catalyst; the $Al_2O_3$ existed as an amorphous or a poorly crystalline phase in these materials. The characteristic diffraction lines of Ni crystals also is not present, demonstrating that the Ni/NiO and $ZrO_2$-M clusters are absent after the calcination step used in the preparation of the materials. The XRD pattern is consistent with $NiAl_2O_4$ plus $ZrO_2$-T nanophases. Based on a comparison with database from the International Centre for Diffraction Data, the particle sizes, $\tau$ are 59-80 Å for $NiAl_2O_4$ and 39-40 Å for $ZrO_2$ based on Scherrer analysis which is defined as $\tau=K\lambda/(\beta \cos \theta)$, where $K=0.9$, $\phi\lambda=1.54056$ Å, $\beta=FWHM$ ($\Delta 2\theta$, radians) and $\theta$ is the Bragg angle in degrees. The sharp peak at 78° is unexplained and may be due to an instrumental feature. The doublet at 64-67° also lacks precise interpretation, although it appears close to the (440) reflection of $NiAl_2O_4$. Yttrium-doped $ZrO_2$ has a very similar pattern to $ZrO_2$. T and, although the reflections are shifted by a small amount, no effort is made to discriminate between the two specimens due to line broadening. Crystal phases are identified as spinel $NiAl_2O_4$ and $ZrO_2$. Vertical lines: Reference data for $NiAl_2O_4$ (blue) and $ZrO_2$ (T) (magenta) are from the 2014 International Centre for Diffraction Data—Powder Diffraction File (PDF).

Figure 14:
FIG. 14 shows transmission electron microscopy (TEM) images of a sample of the catalyst of Example 16.

The high resolution tunneling electron micrograph (HRTEM) images of the calcined catalyst sample obtained in Example 16 are shown in FIG. 14. The HRTEM images show the ordered mesoporous and periodic structure of the sample. Nickel particles could not be observed in these TEM images due to their very small size and the resolution used. This result was consistent with the XRD analysis of the calcined materials where no diffraction lines were observed for Ni. Agglomerates formed swarms of nanoparticles. The nickel particles were indistinguishable in shape, were nanocrystalline, averaged 6 nm in size, and were oriented randomly relative to one another. The EDS measurement (FIG. 15) also indicated the elements present in the order O>Al>Zr>Ni, Mo>Y, similar to the constituent element during synthesis. The origin of Mo and C probably is from the TEM environment. Based on these characterizations it can be concluded that the nickel particle sizes are fairly uniform, averaging 6 nm, and indicate that catalyst was designed and prepared very well.

Figure 16:
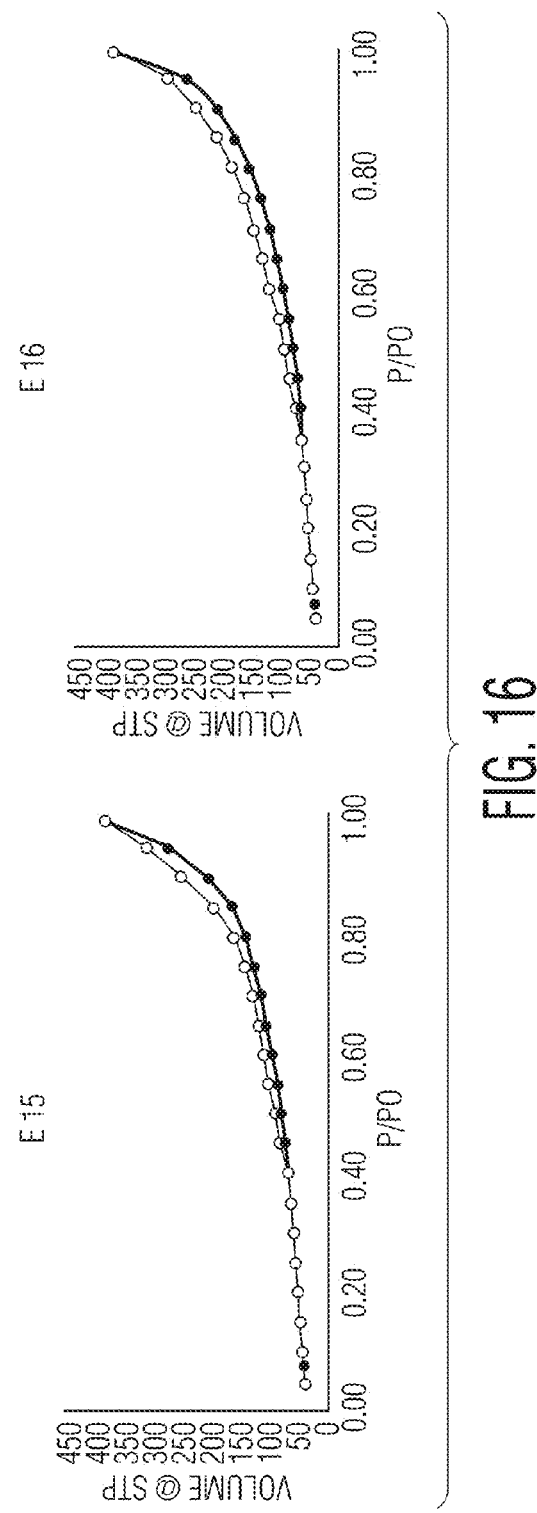
FIG. 16 shows graphs of the nitrogen adsorption/desorption isotherms of the catalysts of Examples 15 and 16.

The synthesized catalysts as shown in FIG. 16 have a high surface area up to 200 $m^2/g$ with a high pore volume (0.67 $cm^3/g$) and a uniform pore size of 6 nm. The hysteresis seen between the adsorption (lower) and desorption (upper) curves indicates the existence of a very large distribution of pores (sizes in the range of 20-500 Å) and provides information regarding the connectivity of the porous network. This connectivity helps in the higher nickel loading without a significant change in the channel shapes or creating small defects on the pore walls of the mesoporous structure The specific surface area, pore diameter, and pore volume of the catalysts are very similar for catalysts of both Example 15 and Example 16 with increasing NiO loading from 7 wt. % (Example 15) to 15 wt. % (Example 16) and could relate with the increased metal loading within the pores by the increasing amounts of added NiO and help in spinel ($NiAl_2O_4$) formation that imparts thermal stability at higher temperature.

Temperature programmed reduction (TPR) also was performed using the same equipment to determine the reducibility range of the catalyst. It can be seen in FIG. 17 that at low temperature there is no $H_2$. adsorption that indicates the absence of any nickel crystallites that could lead to the deactivation of the catalyst. This result also demonstrated the ability to perform dry reforming at high temperatures (up to 950° C.) when required. Based on the results the optimum temperature of the catalyst activation is estimated to be between 900 to 950° C.

There are four main forms of carbon deposited: amorphous ($C_\alpha$), filamentous ($C_\beta$), graphitic ($C_\gamma$), and bulk carbon. It has been reported (Guczi, et al., *Appl. Catal. A., Vol.* 375, pgs. 236-246 (2010)) that among these carbon types, amorphous carbon is the most active, being consumed rapidly by the Boudard reaction ($CO_2+C \rightarrow C+2CO$, $\Delta H_r=-171$ kJ/mol), while it is proposed that filamentous and graphitic carbon do not block active sites, but are consumed at a lesser rate than amorphous carbon. It is the bulk carbon that causes a rapid loss of activity through physical coverage of the active sites and that this carbon is not consumed in the Boudard reaction at all. The strategy to improve the activity of Ni-based catalysts and to prevent the deposition of inactive carbon (and hence improve the lifetime of Ni-based catalysts) is to have an optimum metal dispersion/particle size and good support-metal interaction through these catalysts. An optimum metal/support interaction causes an ease of reducibility of the catalyst and results in high dispersion of small active Ni particles, which show less carbon deposition over time and a greater overall activity also confirmed through the TPR (FIG. 17) in addition to the high surface area supports that can be effective in increasing Ni dispersion and thermal stability, thereby decreasing the deactivation over time of the catalysts due to sintering and migration effects. It can be seen in FIG. 18 that the catalysts of Example 15 and Example 16 have outperformed the other catalysts (both commercial and exploratory) in terms of stability under similar conditions.

Figure 18:
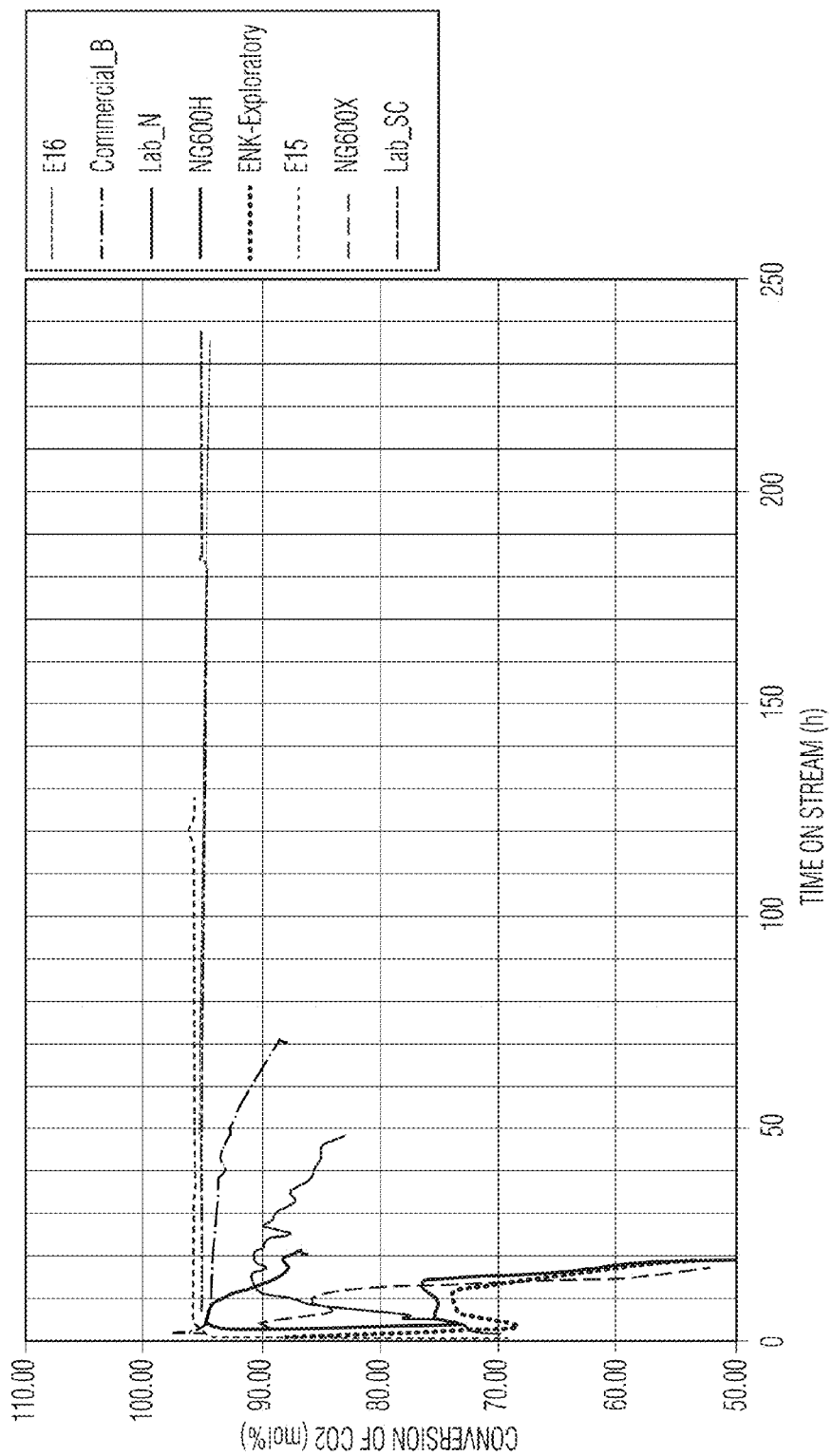
FIG. 18 is a graph showing the time-on-stream (TOS) activity for $CO_2$ reforming of methane for the performance of different catalysts using a gas mixture with a molar concentration of $CO_2:CH_4:N_2$ of 40:40:20 at a gas hourly space velocity (GHSV) of 2,200 $hr.^{-1}$ at 850° C.
Figure 19:
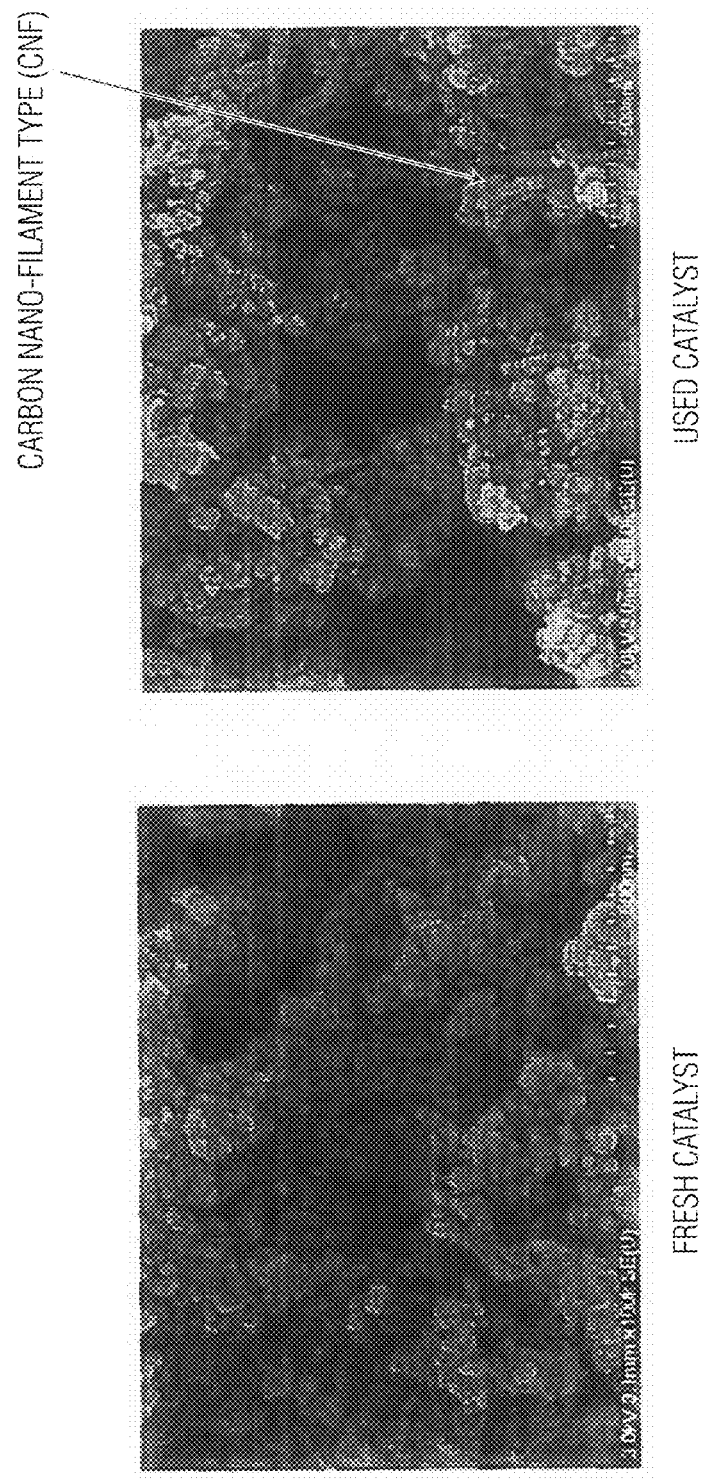
FIG. 19 shows scanning electron microscopy (SEM) micrographs of fresh and used catalysts of Example 16.

It can be seen in FIG. 18 that a very high stability of up to 240 hours' time-on-stream is obtained for the catalyst of Example 16. The conversion observed was very close to equilibrium and there was no observed formation of water, indicating that the reverse-water-gas shift (RWGS) is limited or absent. RWGS is considered one of the major factors that lead to the catalyst deactivation. A similar performance also has been observed for the catalyst of Example 15. On the other hand, all the other commercial catalysts tested have deactivated in less than 25 hours. This stability test illustrates further the efficiency of the preparative control during the manufacturing of the catalyst that controls the particle size of the active metal to less than 15 nm, which reduces the sintering of nickel particles at higher temperatures. By limiting the sintering ability of the nickel particles trapped within the mesopore channels of the supporting structure, the majority of the active particles located within the bulk of the material can be kept less than 15 nm, which is considered the optimum size for the deposition of filamentous carbon nanofiber (CNF) carbon. This would explain overall long term stability of the catalysts, where less active carbon types such as graphitic and bulk carbon formation are reduced significantly due to the less than 15 nm particle size of the nickel. This is revealed in the SEM micrograph in FIG. 19 where both the fresh and used catalyst (after 240 h, TOS) are compared and it can be seen that the used catalyst is almost clean and appears similar to the fresh catalyst, with some evidence of CNF being present. It is expected that the Boudard reaction utilizing this CNF can proceed to an extent so that the activity and long term stability of the catalyst is maintained. Smaller Ni particles trapped within the pores may lead to only active forms of carbon which are utilized rapidly.

Figure 20:
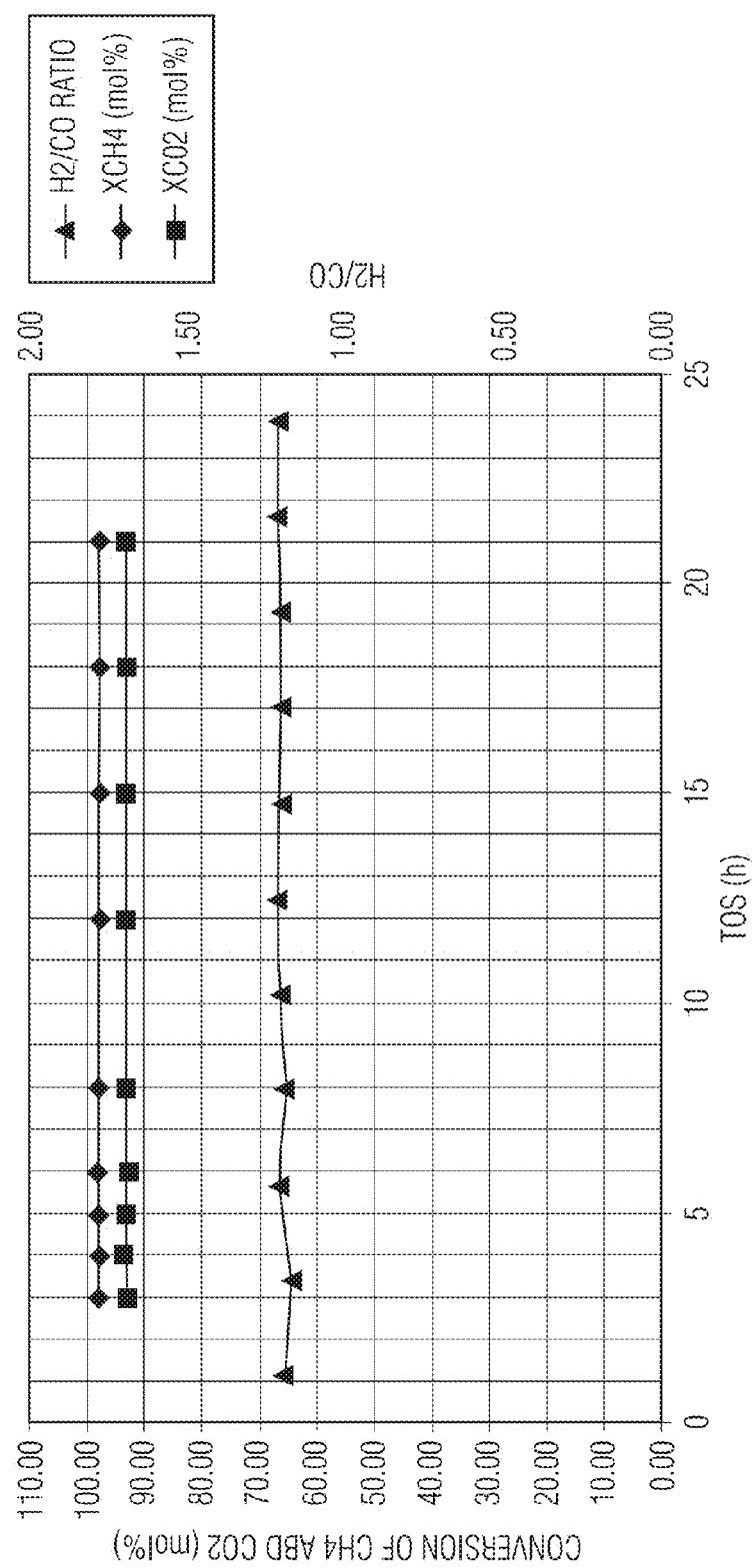
FIG. 20 is a graph showing the conversion of methane and carbon dioxide (mole %), time-on-stream (TOS, in hours), and hydrogen to carbon monoxide molar ratio resulting from the reforming of methane and carbon dioxide in the presence of the catalyst of Example 16.

The catalyst also can be used in the presence of a small amount of steam to mimic the bi-reforming process where both steam and dry reforming simultaneously can take place in a single reactor for effective production of industrially useful syngas. The initial results indicate (FIG. 20) that reforming of methane in the presence of $CO_2$ and water in a fixed-bed flow reactor at 875° C. with supported nickel catalysts of Example 16 not only will produce synthesis gas ($CO+H_2$) with desired $H_2/CO$ ratios (1.2-2.0), but also could eliminate carbon formation (such as CNF types) if present on the surface of the catalyst. It can be seen that over 95% $CH_4$ conversion and about 92% $CO_2$ conversion can be achieved with the catalyst of Example 16 with a very stable performance for more than 20 hours time-on-stream.

Example 17

Catalysts for methane reforming using $CO_2$ and/or a steam mixture that produces a $H_2/CO$ mixture that may be used to synthesize chemicals such as acetic acid, ethanol, propanol, acrolein, and other oxygenated and non-oxygenated organic compounds. The catalyst is designed to work under reduced steam environment in the presence of $CO_2$. The catalysts are multi-component nanocomposites and are based on three or more metal oxides in cubic crystal lattice symmetry. The catalysts were manufactured in two steps: support preparation and active metal impregnation using industrially available standard techniques. The support materials are chosen from aluminum, zirconium, yttrium and magnesium or combinations thereof in order to increase thermal stability, activity and resistance to coke and steam. The active metal may be nickel. A comparison of the chemical compositions of the catalysts of Example 15 and 16 were determined from NAA (neutron activation analysis) that determine the total concentration (both in bulk and surface) of the constituent oxides present in the catalyst indicate that up to 15 wt. % NiO can be incorporated as shown in Table 3 below.

TABLE 3

| Composition (wt. %) | Example 15 | Example 16 |
| --- | --- | --- |
| $Al_2O_3$ | 56.0 | 52.7 |
| NiO | 6.8 | 14.4 |
| $ZrO_2$ | 31.5 | 26.8 |
| $Y_2O_3$ | 5.7 | 6.2 |

The template approach used in this study to prepare mesoporous alumina-based catalysts leads to the production of a highly ordered, thermally stable support structure that when impregnated with active Ni particles remains within the channels of the microorganism and have a reduced likelihood of sintering at high temperatures and subsequent performance loss. The specific surface area of the supports, pore diameter, and pore volume of the catalysts with increasing Ni loading are reported in Table 4 below. From the data presented it can be seen that there is almost no decline in pore diameter and pore volume with staggered Ni loading in the catalyst of Example 16. This most likely is due to increased metal loading within the pores by the increasing amounts of added Ni as in the catalyst of Example 16. The trend observed for BET surface area with respect to increasing Ni loading, where the catalyst containing an intermediate amount of Ni catalyst (Example 15) and a catalyst containing a higher amount of Ni (staggered loading in Example 16) had very similar surface pore volume and diameter data, which indicates that the nickel sits primarily in the micropores of the support structure.

TABLE 4

| Catalyst | BET surface area ($m^2/g$) | Pore volume (cc/g) | Pore diameter (nm) |
| --- | --- | --- | --- |
| Example 15 | 203.7 | 0.622 | 6.1 |
| Example 16 | 197.3 | 0.627 | 6.4 |

Detailed XRD on the catalyst of Example 16 indicated that the diffraction patterns observed for phases that includes $NiAl_2O_4$ spinel and $ZrO_2$. The nanocrystalline sizes assessed using the Scherrer relation indicated 5.9-8.0 nm for $NiAl_2O_4$ and 3.9-4.0 nm for $ZrO_2$. No NiO or Ni metal were present in the structure indicating an optimum dispersion. (FIG. 13)

TEM analysis of catalyst Example 15 indicates that agglomerates formed swarms of nanoparticles where the particles were indistinguishable in shape and are nanocrystalline with an average particle size of 6 nm and are oriented randomly relative to one another. (FIG. 14)

The TEM analyses of the catalyst of Example 16 identify nanophases and particle sizes that compared very well with the results obtained from XRD. TEM of the catalyst of Example 16 confirms particle sizes of the nickel (~4-8 nm) obtained with powder XRD. The dispersion of nickel particle sizes appears to be fairly uniform, averaging 6 nm.

Figure 15:
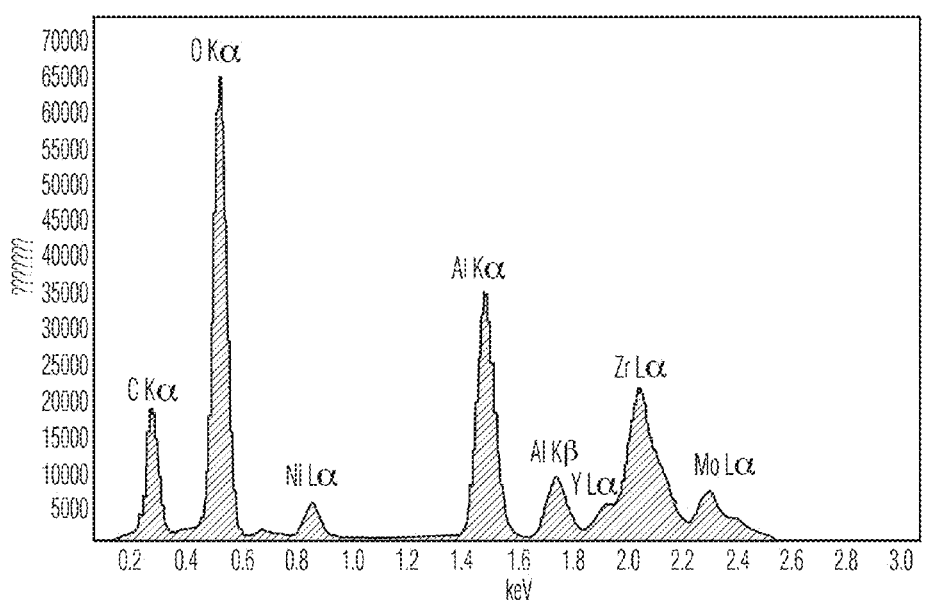
FIG. 15 is a graph showing energy dispersive spectroscopy (EDS) analysis for elements present in the catalyst of Example 16.

Energy dispersive spectroscopy (EDS) detected Ni, Al, Zr and Y signals. (FIG. 15)

Figure 17:
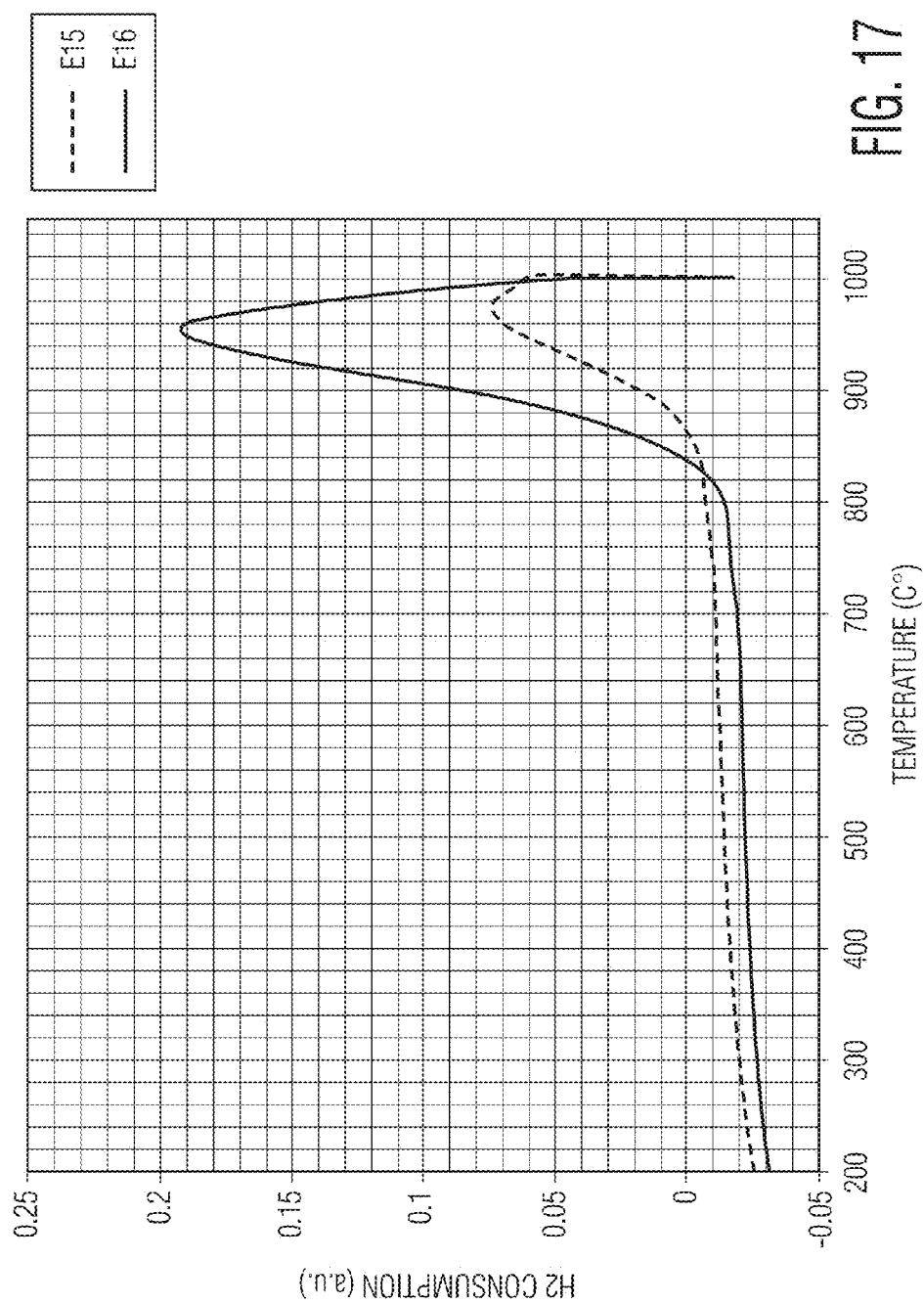
FIG. 17 is a graph showing the temperature programmed reduction (TPR) profiles of the catalysts of Examples 15 and 16.

The catalysts showed high thermal stability and had strong anti-carbon properties due to high preparative control, which resulted in well dispersed active metal sites which interacted to a strong degree with the support structure. This is confirmed through the TPR analysis where a very high $H_2$ consumption is observed at temperature around 950° C. (FIG. 17). This illustrates that the catalyst can be activated and be used at high temperature requirements for steam-induced $CO_2$ reforming.

The presence of highly distributed active metal sites with small particle size in a high surface area support structure has been achieved in these catalysts which can utilize $CH_4$ rich and hydrocarbon rich tail-gas in the presence of $CO_2$ for enhanced syngas yield and simultaneous carbon footprint reduction.

The disclosures of all patents and publications (including published patent applications) are incorporated herein by reference to the same extent as if each patent and publication were incorporated individually by reference.

It is to be understood, however, that the scope of the present invention is not to be limited to the specific embodiments described above. The invention may be practiced other than as particularly described and still be within the scope of the accompanying claims.

What is claimed is:

1. A catalyst, comprising:
   (a) at least one catalytic metal, wherein said at least one catalytic metal is selected from the group consisting of nickel, cobalt, and a combination of nickel and cobalt; and
   (b) a support including a mixed oxide containing aluminum, calcium, and magnesium.

2. The catalyst of claim 1 wherein said mixed oxide further contains lanthanum.

3. A catalyst, comprising:
   (a) at least one catalytic metal, wherein said at least one catalytic metal is selected from the group consisting of nickel, cobalt, and a combination of nickel and cobalt; and
   (b) a support including a mixed oxide containing cerium, lanthanum, and zirconium.

4. A catalyst, comprising:
   (a) at least one catalytic metal, wherein said at least one catalytic metal is selected from the group consisting of nickel, cobalt, and a combination of nickel and cobalt; and
   (b) a support including a mixed oxide containing cerium, zirconium, and aluminum.

5. The catalyst of claim 4 wherein said mixed oxide further contains magnesium.

6. A catalyst, comprising:
   (a) at least one catalytic metal, wherein said at least one catalytic metal is selected from the group consisting of nickel, cobalt, and a combination of nickel and cobalt; and
   (b) a support including a mixed oxide containing aluminum, cerium, zirconium, and calcium.

7. A catalyst, comprising:
   (a) at least one catalytic metal, wherein said at least one catalytic metal is selected from the group consisting of nickel, cobalt, and a combination of nickel and cobalt; and
   (b) a support including a mixed oxide containing at least three metals, wherein said at least three metals includes aluminum, wherein said aluminum is present in said catalyst, on a metal basis, in an amount of from about 20 atom % to about 92 atom %, and wherein the remaining at least three metals are selected from the group consisting of zirconium, lanthanum, magnesium, cerium, calcium, and yttrium, with the provisos that, when said support contains only three metals, said three metals are not aluminum, lanthanum, and magnesium.

8. The catalyst of claim 7 wherein said aluminum is present in said catalyst, on a metal basis, in an amount of from about 35 atom % to about 75 atom %.

9. The catalyst of claim 7 wherein said at least one catalytic metal is nickel.

10. A catalyst, comprising:
    (a) at least one catalytic metal, wherein said at least one catalytic metal is selected from the group consisting of nickel, cobalt, and a combination of nickel and cobalt; and
    (b) a support including a mixed oxide containing at least three metals, wherein said at least three metals includes calcium, wherein said calcium is present in said catalyst, on a metal basis, in an amount of from about 2 atom % to about 50 atom %, and wherein the remaining at least three metals are selected from the group consisting of aluminum, zirconium, lanthanum, magnesium, cerium, and yttrium, with the proviso that, when said support contains only four metals, such four metals are not cerium, lanthanum, potassium and calcium.

11. The catalyst of claim 10 wherein said calcium is present in said catalyst, on a metal basis, in an amount of from about 2 atom % to about 35 atom %.

12. A catalyst, comprising:
    (a) at least one catalytic metal, wherein said at least one catalytic metal is selected from the group consisting of nickel, cobalt, and a combination of nickel and cobalt; and
    (b) a support including a mixed oxide containing at least three metals, wherein said at least three metals includes magnesium, wherein said magnesium is present in said catalyst, on a metal basis, in an amount of from about 10 atom % to about 65 atom %, and wherein the remaining at least three metals are selected from the group consisting of aluminum, zirconium, lanthanum, cerium, calcium, and yttrium, with the proviso that, when said support contains only three metals, said three metals are not aluminum, lanthanum, and magnesium.

13. The catalyst of claim 12 wherein said magnesium is present in said catalyst, on a metal basis, in an amount of from about 15 atom % to about 50 atom %.

14. A catalyst, comprising:
    (a) at least one catalytic metal, wherein said at least one catalytic metal is selected from the group consisting of nickel, cobalt, and a combination of nickel and cobalt; and
    (b) a support including a mixed oxide containing at least three metals, wherein said at least three metals includes yttrium, wherein said yttrium is present in said catalyst, on a metal basis, in an amount of from about 2 atom % to about 15 atom %, and wherein the remaining at least three metals are selected from the group consisting of aluminum, zirconium, lanthanum, magnesium, cerium, and calcium.

15. The catalyst of claim 14 wherein said yttrium is present in said catalyst, on a metal basis, in an amount of from about 3 atom % to about 10 atom %.

16. The catalyst of claim 14 wherein said at least one catalytic metal is nickel.

17. A catalyst, comprising:
    (a) at least one catalytic metal, wherein said at least one catalytic metal is selected from the group consisting of nickel, cobalt, and a combination of nickel and cobalt; and
    (b) a support including a mixed oxide containing at least three metals, wherein said at least three metals includes zirconium, wherein said zirconium is present in said catalyst, on a metal basis, in an amount of from about 2 atom % to about 30 atom %, and wherein the remaining at least three metals are selected from the group consisting of aluminum, lanthanum, magnesium, cerium, calcium, and yttrium.

18. The catalyst of claim 17 wherein said zirconium is present in said catalyst, on a metal basis, in an amount of from about 5 atom % to about 25 atom %.

19. The catalyst of claim 17 wherein said at least one catalytic metal is nickel.

20. A catalyst, comprising:
  (a) a catalytic metal, wherein said catalytic metal is nickel; and
  (b) a support including a mixed oxide comprising aluminum, zirconium, and yttrium, wherein said catalyst, on a metal basis, contains up to about 10 wt. % nickel, up to about 50 wt. % aluminum, up to about 30 wt. % zirconium, and up to about 8 wt % yttrium.

21. A catalyst, comprising:
  (a) a catalytic metal, wherein said catalytic metal is nickel; and
  (b) a support including a mixed oxide comprising aluminum, zirconium, and yttrium, and wherein said catalyst, on a metal basis, includes 8 atom % nickel, 70 atom % aluminum, 18.5 atom % zirconium, and 3.5 atom % yttrium.

* * * * *